US012482967B2

(12) United States Patent
Sato et al.

(10) Patent No.: US 12,482,967 B2
(45) Date of Patent: Nov. 25, 2025

(54) CONNECTOR WITH SUBSTRATE

(71) Applicant: JAPAN AVIATION ELECTRONICS INDUSTRY, LIMITED, Tokyo (JP)

(72) Inventors: Yukiko Sato, Tokyo (JP); Yukitaka Tanaka, Tokyo (JP); Gota Kameyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 327 days.

(21) Appl. No.: 18/140,178

(22) Filed: Apr. 27, 2023

(65) Prior Publication Data

US 2024/0030632 A1 Jan. 25, 2024

(30) Foreign Application Priority Data

Jul. 25, 2022 (JP) ................................ 2022-118181

(51) Int. Cl.

*H01R 13/62* (2006.01)
*H01R 12/57* (2011.01)
*H01R 12/70* (2011.01)
*H01R 12/71* (2011.01)
*H01R 13/508* (2006.01)
*H01R 13/639* (2006.01)

(52) U.S. Cl.

CPC ......... *H01R 12/7064* (2013.01); *H01R 12/57* (2013.01); *H01R 12/712* (2013.01); *H01R 13/508* (2013.01); *H01R 13/639* (2013.01)

(58) Field of Classification Search

CPC .............................. H01R 12/57; H01R 12/712
See application file for complete search history.

(56) References Cited

U.S. PATENT DOCUMENTS 7,156,678 B2 * 1/2007 Feldman .............. H01R 12/712 439/326
7,374,429 B2 * 5/2008 Cronch .................. H01R 12/79 439/496
8,043,114 B2 * 10/2011 Kaneko ................ H01R 12/775 439/468

(Continued)

FOREIGN PATENT DOCUMENTS

CN 101789556 A 7/2010
JP 2000-012123 A 1/2000

(Continued)

OTHER PUBLICATIONS

Taiwan Intellectual Property Office, "Office Action with Search Report for Taiwanese Patent Application 112118553," Dec. 6, 2023.

*Primary Examiner* — Neil Abrams
(74) *Attorney, Agent, or Firm* — Kreative IP Management LLC; Fuiyeong Kim

(57) ABSTRACT

In a connector with substrate, a compression connector pressed against and connected to a connection target object and a substrate are attached via a cage. The connector with substrate includes a substrate; a cage fixed on the substrate; and a compression connector inserted into the cage and including contacts that are in contact with the substrate, a housing to which the contacts are fixed, and a cover shell that covers an upper surface portion of the housing. The cage or the compression connector includes an elastic body that applies an elastic force for fixing the compression connector to the cage.

10 Claims, 36 Drawing Sheets

(56) References Cited

U.S. PATENT DOCUMENTS

| | | | | |
|---|---|---|---|---|
| 8,388,370 | B2 * | 3/2013 | Yamaji | H01R 12/82<br>439/497 |
| 8,550,849 | B2 * | 10/2013 | Yamaji | H01R 12/725<br>439/495 |
| 8,727,803 | B2 * | 5/2014 | Kurachi | H01R 13/639<br>439/497 |
| 9,893,445 | B1 * | 2/2018 | Ju | H01R 12/721 |
| 10,804,652 | B2 * | 10/2020 | Muro | H01R 13/6273 |
| 11,469,552 | B2 * | 10/2022 | Kim | H01R 9/0524 |
| 2006/0228952 | A1 | 10/2006 | Feldman et al. | |
| 2010/0184337 | A1 | 7/2010 | Yamaji et al. | |

FOREIGN PATENT DOCUMENTS

| | | | |
|---|---|---|---|
| JP | 2013-125694 | A | 6/2013 |
| JP | 2017-174746 | A | 9/2017 |

* cited by examiner

Prior Art

CONNECTOR WITH SUBSTRATE

CROSS-REFERENCE TO RELATED APPLICATION

The present application is based on and claims priority from Japanese Patent Application No. 2022-118181 filed on Jul. 25, 2022, the disclosure of which is hereby incorporated by reference herein in its entirety.

BACKGROUND OF THE INVENTION

Field of the Invention

The present invention relates to a connector with substrate.

Description of the Related Art

A connector of a compression type pressed against and connected to a connection target object such as a substrate has been publicly known. The structure of the connector of this type is disclosed in, for example, Japanese Patent Application Laid-Open No. 2000-12123 (Patent Literature 1). The connector of the compression type of the related art disclosed in Patent Literature 1 described below is configured as an electric connector (1) including a contact (20) including an elastic spring section (23) as shown in FIG. 36. In the electric connector (1), a plurality of contacts (20) are disposed in an arrayed state.

The contact (20) includes a substrate connecting section (22) solder-connected to a first circuit board (30) and a contact section (24) that is in contact with a second circuit board (40). The elastic spring section (23) having a spring property is provided between the substrate connecting section (22) and the contact section (24). The second circuit board (40) is pressed from the upward side of the contact (20) attached on the first circuit board (30) by solder-connection, whereby the elastic spring section (23) of the contact (20) exerts the spring property to generate a contact pressure between the second circuit board (40) and the contact (20). Note that reference numerals and signs concerning explanation of the related art document are distinguished from those in embodiments of the present invention by being parenthesized.

In the compression connector of the related art, screwing has been used for attachment (fixing) to the substrate.

However, when the compression connector is fixed to the substrate by the screwing, in general, a method of attaching nuts from a substrate surface on the opposite side of a connector mounting surface side on which the connector is mounted and tightening screws from the connector mounting surface side is adopted. In such a case of the related art, an operator needs to press the connector and the nuts with a hand or the like while tightening the screws. Thus, there is a problem that it is hard to do connector attaching (fixing) work. That is, since the nuts, which are separate components, are necessary besides the screws in a fixing structure for the compression connector and the substrate by the screwing of the related art, problems exist such as that the nuts are likely to be lost or work manhours increase.

That is, in the compression connector of the related art, it has been demanded to realize a configuration for performing secure attachment while improving workability of attachment in the attachment (fixing) to the substrate.

Accordingly, an object of the present invention is to realize a configuration with which, when a compression connector and a substrate are fixed, connector attaching (fixing) work is simple and the compression connector can be fixed to the substrate with a small motion.

SUMMARY OF THE INVENTION

A connector with substrate according to the present invention is a connector with substrate in which a connector of a compression type pressed against and connected to a connection target object and a substrate are attached via a cage, the connector with substrate including a compression connector including contacts that are in contact with the substrate, a housing to which the contacts are fixed, and a cover shell that covers an upper surface portion of the housing, wherein the compression connector is inserted into the cage fixed to the substrate, and an elastic body that applies an elastic force for fixing the compression connector to the cage is formed in the cage or the compression connector.

That is, the connector with substrate according to the present invention includes a mechanism for attaching the connector of the compression type and the substrate via the cage. By using the elastic body that is formed in the cage or the connector and applies the elastic force, a simple and secure fixed state is obtained. Since the elastic body that applies the elastic force is a member formed in the cage or the connector, the elastic body is not dropped or lost unlike the screws and the nuts of the related art. Further, since the connector with substrate contains a mechanism for fixing the compression connector with the elastic force exerted by the elastic body, unlike with the related art, work manhours involving attachment are reduced and torque management for the screws is unnecessary.

In the connector with substrate according to the present invention, a spring piece that presses the compression connector against a pressing section of the cage can be present in the cage, and the spring piece can be formed in a projecting section formed on a connector insertion side of the cage.

In the connector with substrate according to the present invention, the spring piece can be obliquely formed from a base to a distal end of the spring piece such that the compression connector can be obliquely inserted into the cage.

In the connector with substrate according to the present invention, a hole can be formed in the substrate such that a distal end of the spring piece can enter the hole.

Further, in the connector with substrate according to the present invention, a lock lever rotatable in an inserting direction into the cage can be formed in the compression connector, and a lock hole that a lock section of the lock lever enters can be formed in the cage.

In the connector with substrate according to the present invention, a top surface that receives contact reaction of the compression connector can be present in the cage, and a lock hole can be formed in a vertical surface vertically bent from the top surface.

Further, in the connector with substrate according to the present invention, the compression connector can include a bottom shell that covers a lower surface portion of the housing.

According to the present invention, it is possible to realize a structure in which, when the compression connector and the substrate are fixed, connector attaching (fixing) work is easy and the compression connector can be fixed to the substrate with a small motion. In particular, in the present invention, the compression connector only has to be installed with respect to the cage formed on the substrate in advance. Positioning and fixing are easy. Therefore, according to the present invention, it is possible to perform secure attachment while improving workability of attachment (fixing) of the compression connector to the substrate.

DETAILED DESCRIPTION OF THE PREFERRED EMBODIMENTS

Preferred embodiments for carrying out the present invention are explained below with reference to the drawings. Note that, in the figures, a first direction, a second direction, and a third direction are defined for convenience of explanation. In this specification, the first direction is the front-rear direction. In the figures, the front-rear direction is shown as an X direction. In particular, a forward direction is represented as a +X direction and a rearward direction is represented as a −X direction. In this specification, the second direction is the left-right direction. In the figures, the left-right direction is shown as a Y direction. In particular, the right direction is represented as a +Y direction and the left direction is represented as a −Y direction. Further, in this specification, the third direction is the up-down direction. In the figures, the up-down direction is shown as a Z direction. In particular, an upward direction is represented as +Z direction and a downward direction is represented as −Z direction. However, the X direction, which is the first direction, the Y direction, which is the second direction, and the Z direction, which is the third direction, defined in this specification do not limit directions at the time of use of connectors with substrate in the embodiments. The connectors with substrate in the embodiments can be used in all directions.

The embodiments described below do not limit the inventions according to the claims. Not all of combinations of characteristics explained in the embodiments are essential for the solution of the invention.

First Embodiment

Figure 1:
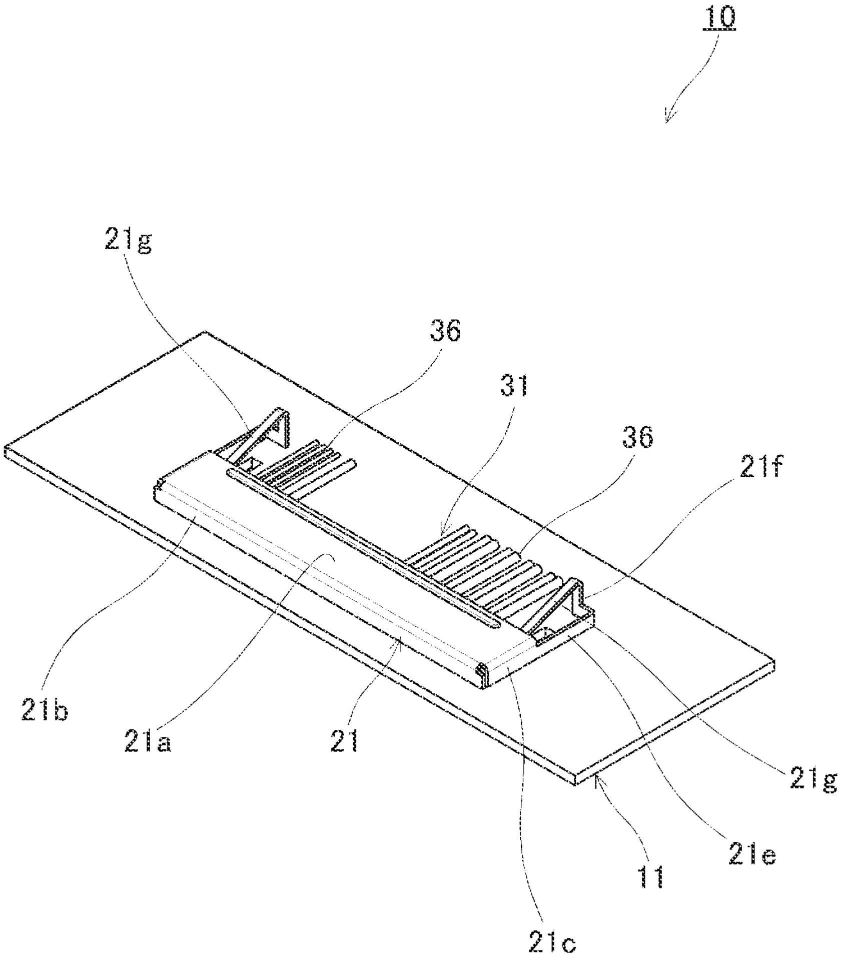
FIG. 1 is an exterior perspective view of a connector with substrate according to a first embodiment viewed from the front upper right.
Figure 1:
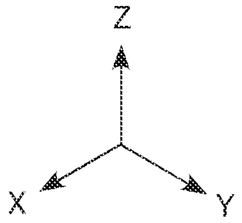
Figure 2:
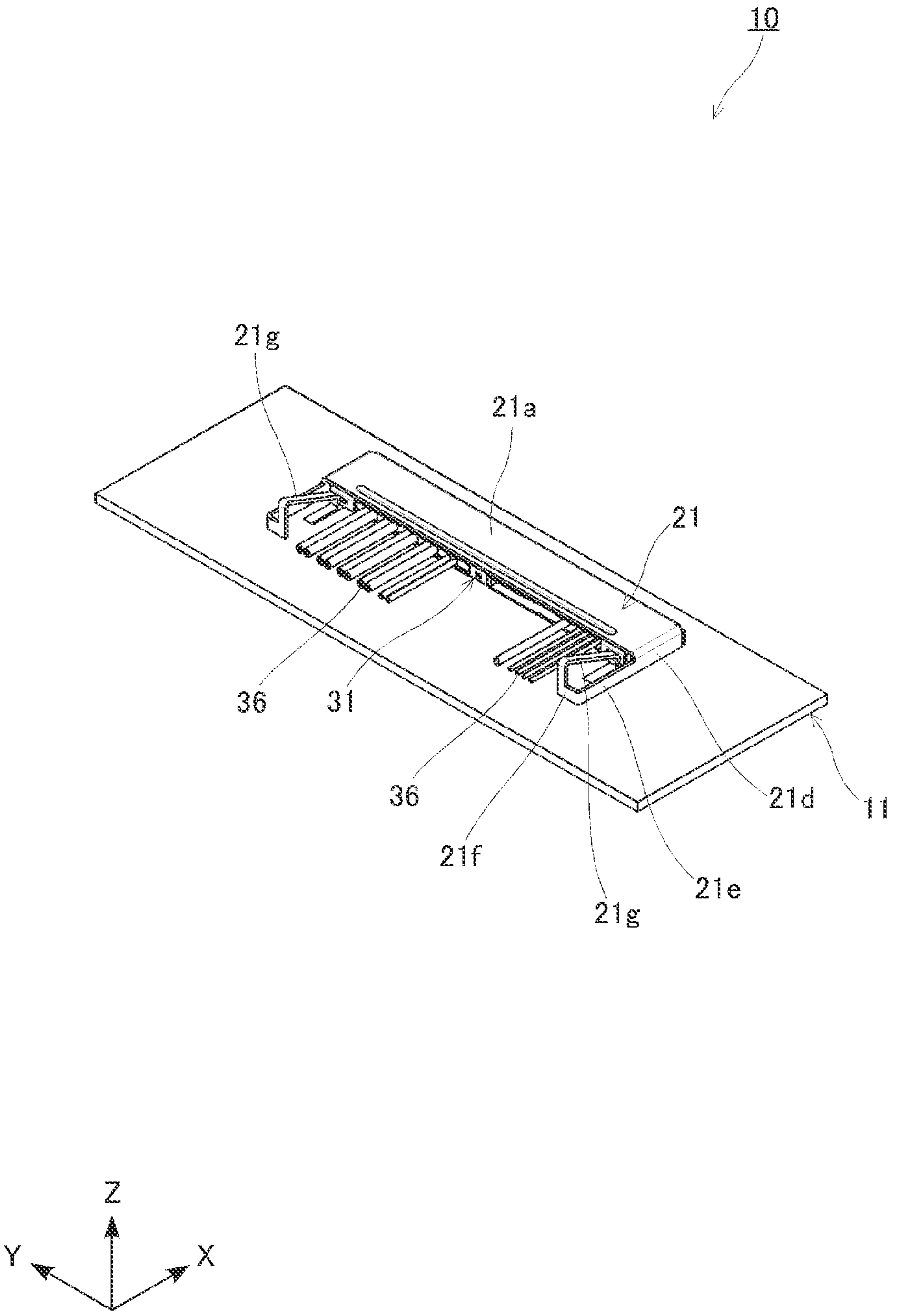
FIG. 2 is an exterior perspective view of the connector with substrate according to the first embodiment viewed from the rear upper left.

A configuration of a connector with substrate 10 according to a first embodiment is explained with reference to FIGS. 1 to 19. The connector with substrate 10 according to the first embodiment includes, as shown in FIGS. 1 to 3, a substrate 11, a cage 21 installed on the upper surface of the substrate 11, and a compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 3:
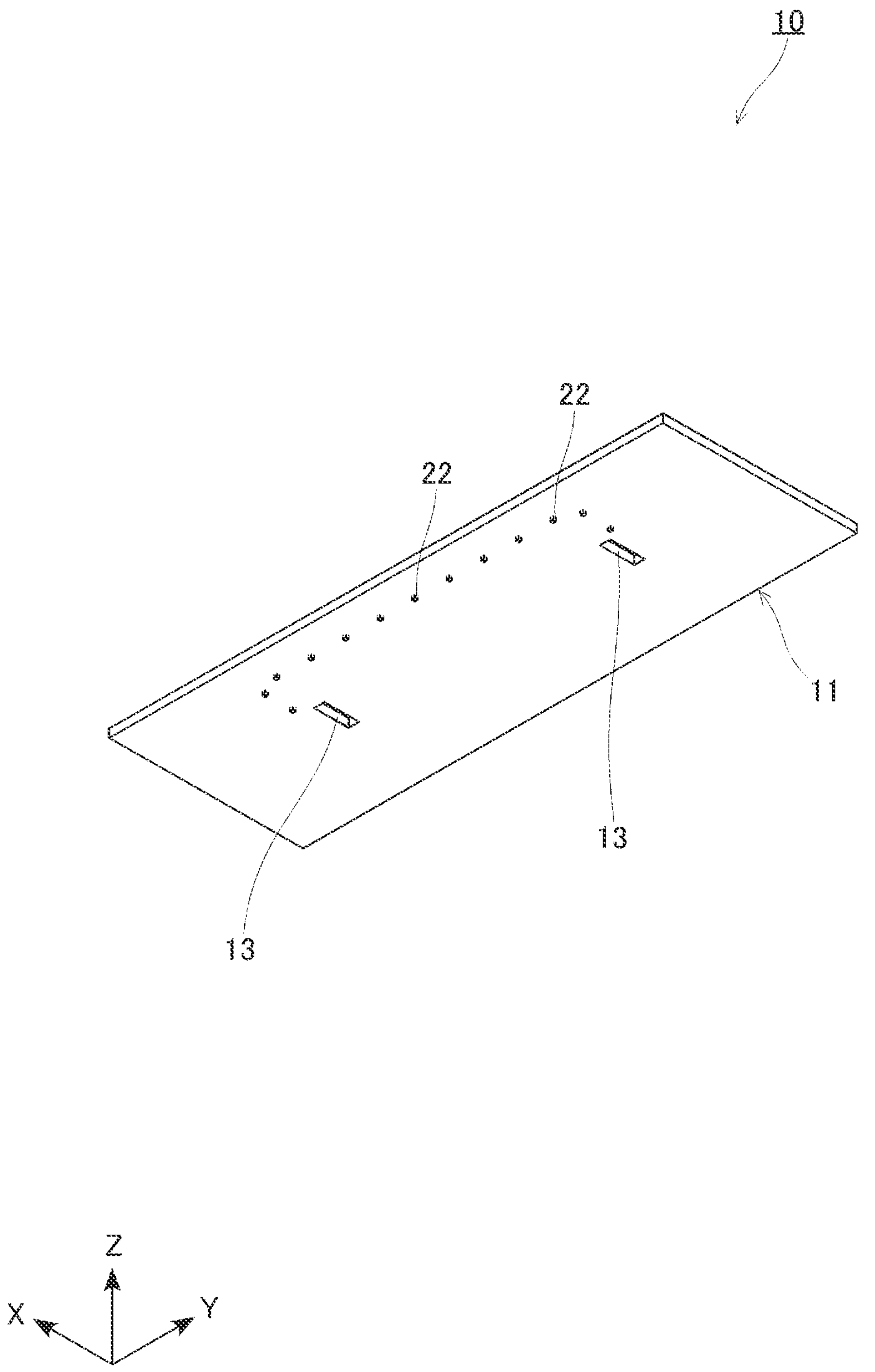
FIG. 3 is an exterior perspective view of the connector with substrate according to the first embodiment viewed from the front lower right.
Figure 4:
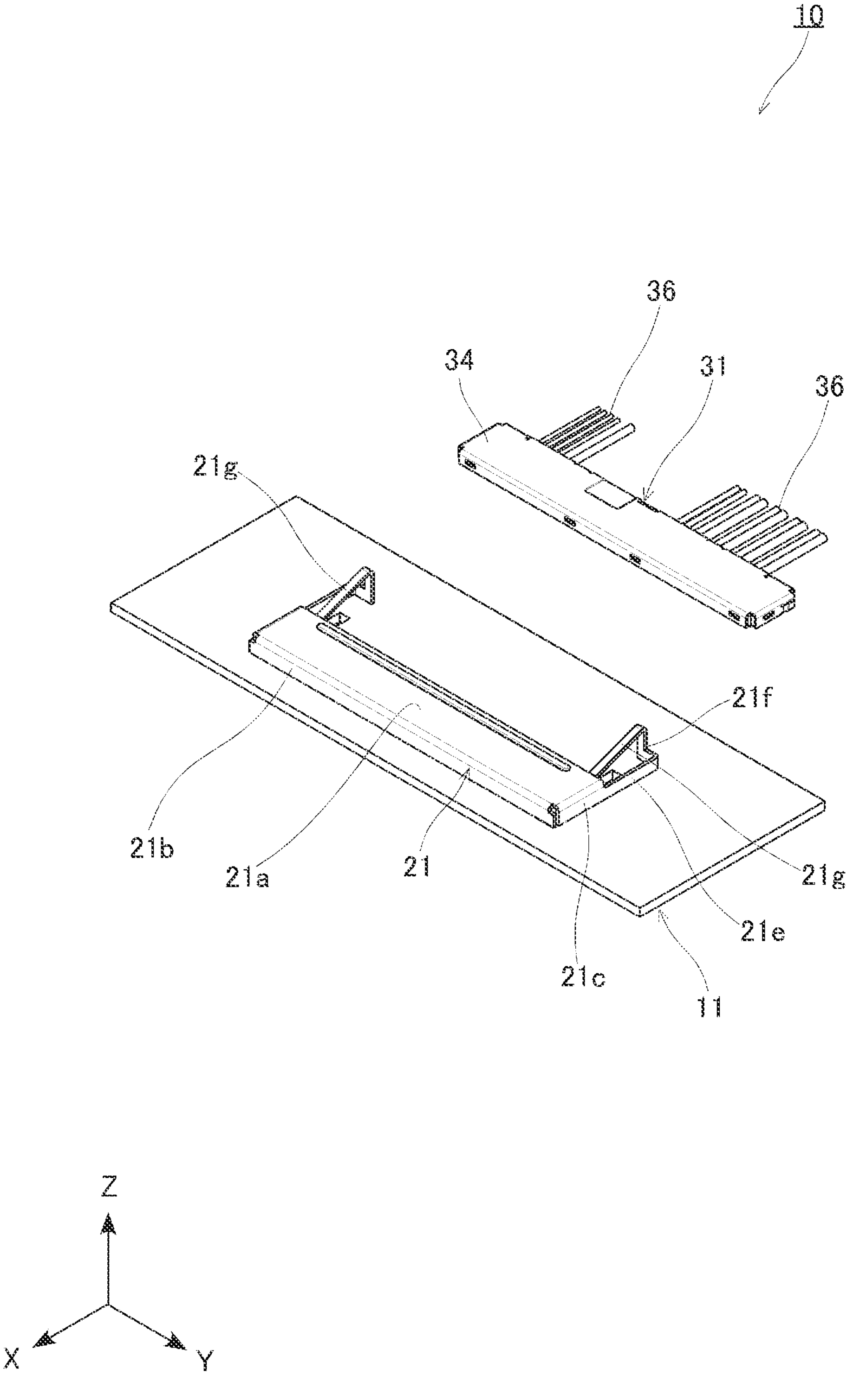
FIG. 4 is an exterior perspective view of a state in which a compression connector is detached from a substrate attached with a cage in the connector with substrate according to the first embodiment, the state being viewed from the front upper right.
Figure 5:
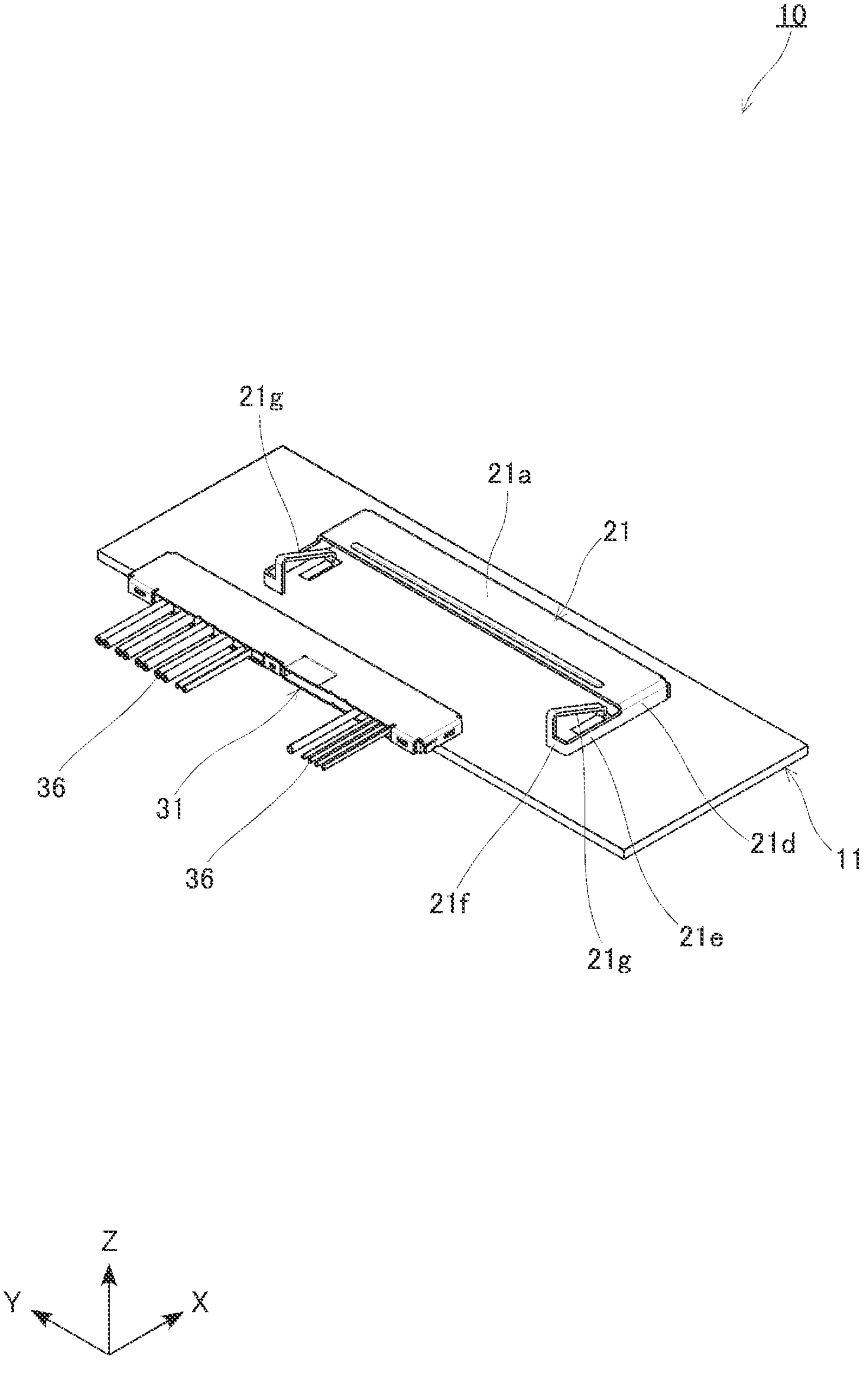
FIG. 5 is an exterior perspective view of the state in which the compression connector is detached from the substrate attached with the cage in the connector with substrate according to the first embodiment, the state being viewed from the rear upper left.
Figure 6:
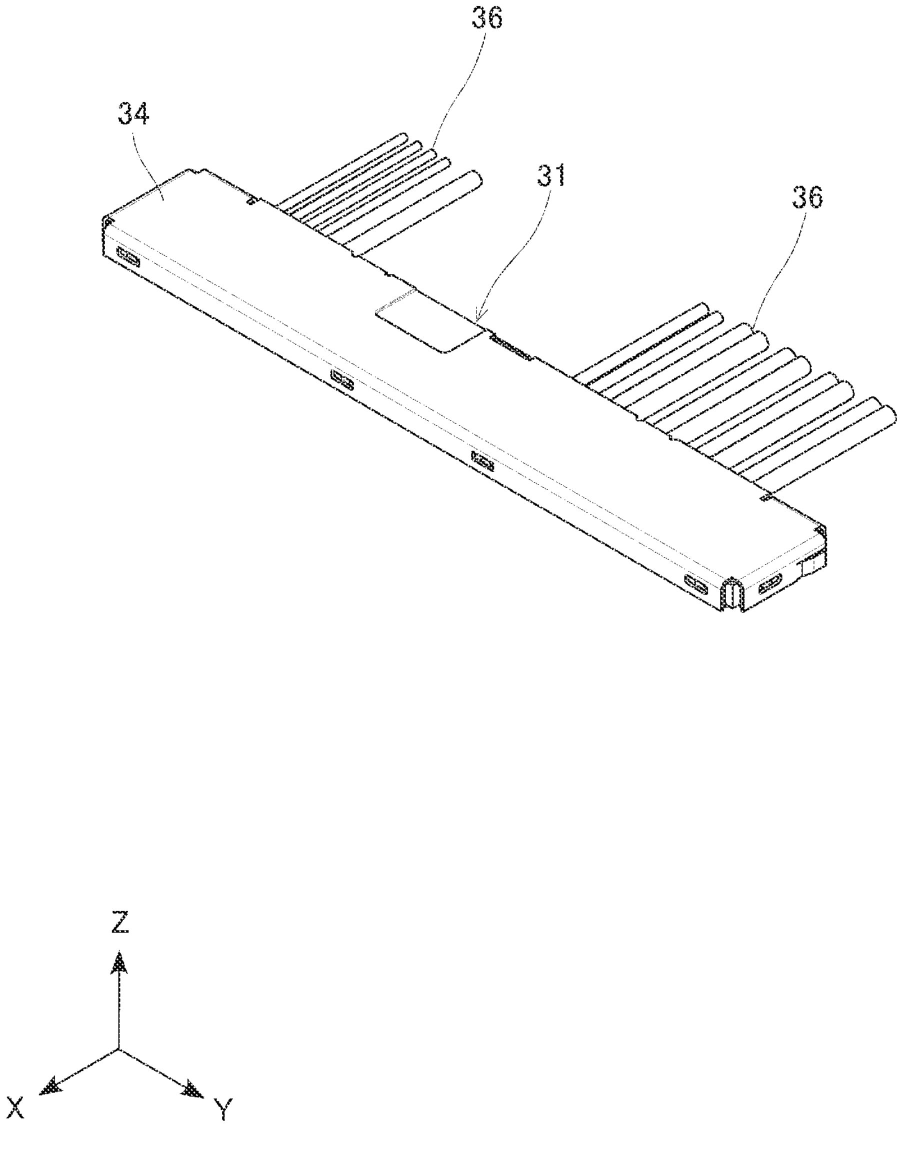
FIG. 6 is an exterior perspective view of the compression connector according to the first embodiment viewed from the front upper right.

A plurality of attachment holes (not shown) and a plurality of opening sections 13 functioning as the hole of the present invention are formed in the substrate 11 (see FIG. 3). A plurality of leg sections 22 included in the cage 21 explained below are inserted into the plurality of (in the first embodiment, assumed to be thirteen) attachment holes (not shown) to fix the cage 21 to the substrate 11. The plurality of (in the first embodiment, two) opening sections 13 are formed such that, when spring pieces 21*g* functioning as the elastic body of the present invention included in the cage 21 explained below are pressed downward from above when the compression connector 31 is inserted, the spring pieces 21*g* can always exert an elastic force by the distal ends of the spring pieces 21*g* entering in the opening sections 13. That is, in the connector with substrate 10 according to the first embodiment, fixing connection of the substrate 11 attached with the cage 21 and the compression connector 31 is not hindered by the presence of the opening sections 13.

As shown in FIGS. 13 to 17, the cage 21 is a member formed by bending a flat metal plate material and includes a top surface 21*a* forming an upper surface and a vertical front surface 21*b*, a vertical right side surface 21*c*, and a vertical left side surface 21*d* formed as the vertical surface of the present invention by being bent vertically from the front and the left and right side surfaces of the top surface 21*a*. A region surrounded by the top surface 21*a*, the vertical front surface 21*b*, the vertical right side surface 21*c*, the vertical left side surface 21*d*, and the upper surface of the substrate 11 is a region where the compression connector 31 is housed and installed.

The plurality of (in the first embodiment, thirteen) leg sections 22 are formed on the lower end faces of the vertical front surface 21*b*, the vertical right side surface 21*c*, and the vertical left side surface 21*d*. The leg sections 22 are formed as shaft-like members extending downward. The plurality of leg sections 22 are inserted into the plurality of attachment holes (not shown) formed in the substrate 11, whereby secure fixing of the substrate 11 and the cage 21 is implemented. As a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

On rear end faces of the vertical right side surface 21*c* and the vertical left side surface 21*d*, projecting sections 21*e* formed to extend toward the rear, which is a connector insertion side for the cage 21, are formed. Further, erected sections 21*f* formed in a substantially L shape are formed at the rear end portions of the projecting sections 21*e*. Furthermore, spring pieces 21*g* formed in an oblique direction with respect to the upper surface of the substrate 11 are formed at the upper end portions of the erected sections 21*f* formed in the substantially L shape.

The spring pieces 21*g* are formed to extend forward from connection sides to the erected sections 21*f*, which are bases of the spring pieces 21*g*, and are obliquely formed to descend forward from the bases to the distal ends of the spring pieces 21*g* such that the distal ends, which are the front end portions, are in positions closer to the substrate 11 than the bases. The spring pieces 21*g* are configured to be able to smoothly insert the compression connector 31 into the cage 21 in an oblique direction by guiding the compression connector 31 toward the region surrounded by the top surface 21*a*, the vertical front surface 21*b*, the vertical right side surface 21*c*, the vertical left side surface 21*d*, and the upper surface of the substrate 11, the region being a region where the compression connector 31 is housed and installed.

Further, when the compression connector 31 is obliquely inserted into the cage 21, external force for pressing the spring pieces 21*g* downward is applied to the spring pieces 21*g*. Even if the spring pieces 21*g* bend downward when such external force is applied, since the opening sections 13 are formed in the substrate 11, the distal ends of the spring pieces 21*g* can enter the insides of the opening sections 13. Therefore, in the connector with substrate 10 according to the first embodiment, an inserting motion of the compression connector 31 is not hindered. When the compression connector 31 is completely inserted into the cage 21, since the external force applied to the spring pieces 21*g* from the compression connector 31 is released, the distal ends of the spring pieces 21*g* slip off the opening sections 13 and move to an upper position. The positions of the distal ends of the spring pieces 21*g* not receiving the external force are equivalent to the position of the rear center of the compression connector 31 completely inserted into and installed in the cage 21. Therefore, the spring pieces 21*g* exert a function of hindering the compression connector 31 from moving in a slipping-off direction to the rear side with respect to the cage 21. That is, the spring pieces 21*g* according to the first embodiment are members that can exert not only a function of guidance in obliquely inserting the compression connector 31 into the cage 21 but also a function of slip-off prevention.

The compression connector 31 includes, as shown in FIGS. 6 to 10, contacts 32 that are in contact with the substrate 11, a housing 33 to which the contacts 32 are fixed, a cover shell 34 that covers the upper surface portion of the housing 33, and a bottom shell 35 that covers the lower surface portion of the housing 33.

Figure 7:
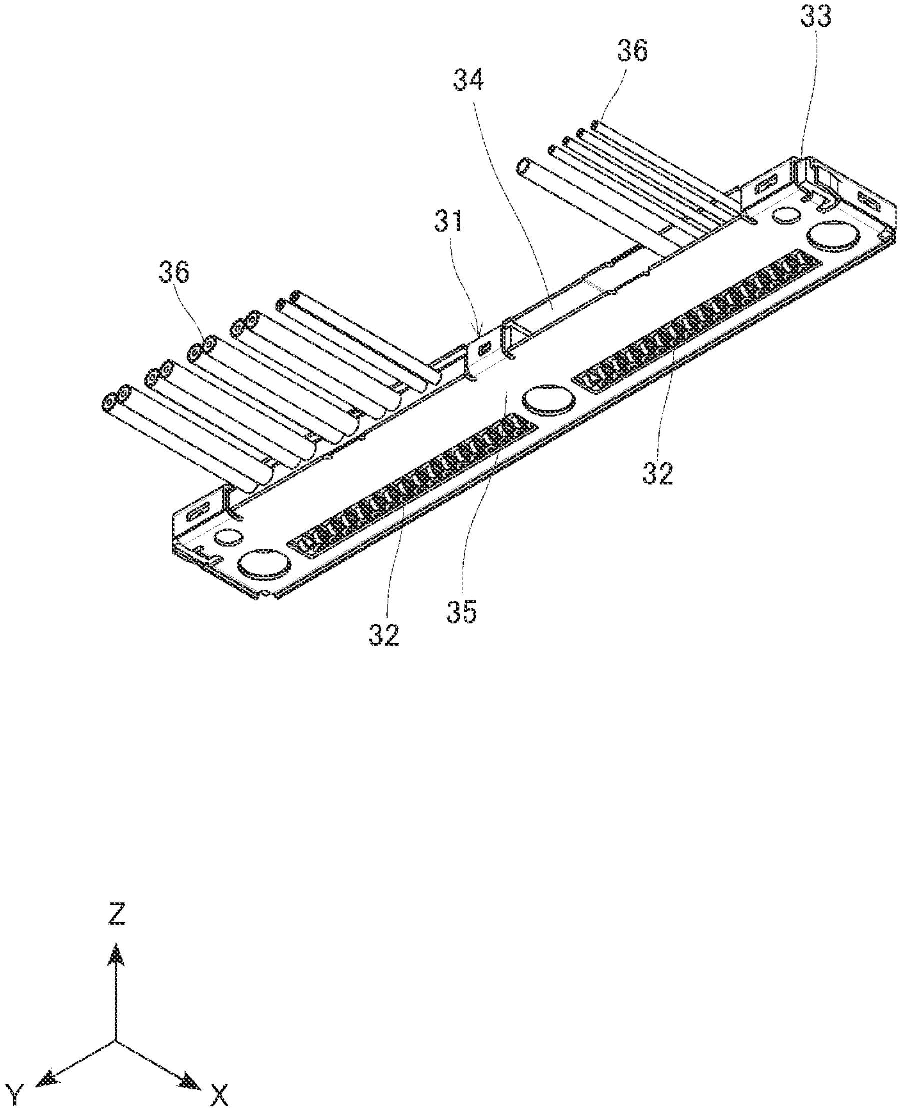
FIG. 7 is an exterior perspective view of the compression connector according to the first embodiment viewed from the rear lower left.
Figure 8:
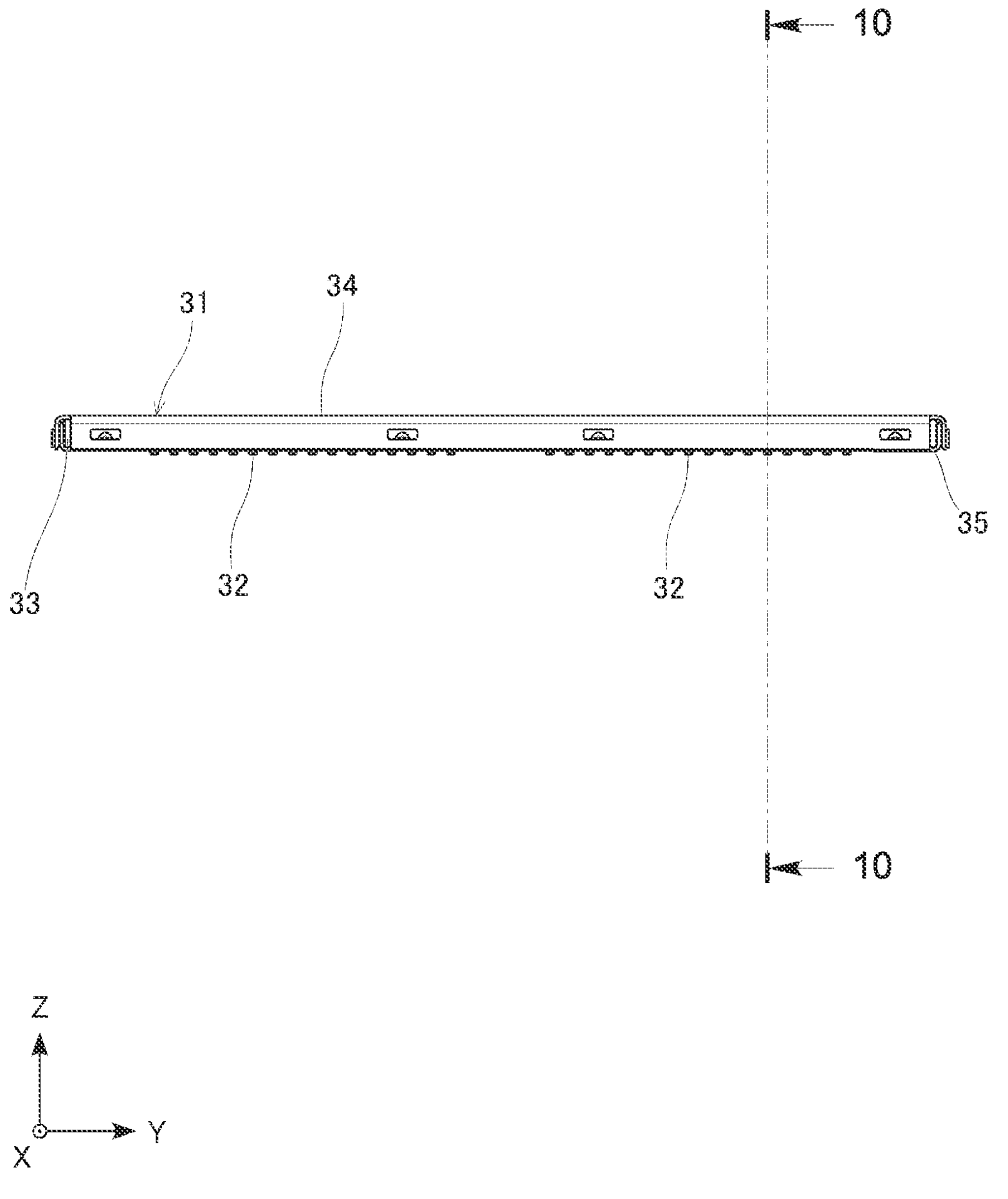
FIG. 8 is a front view of the compression connector according to the first embodiment.
Figure 9:
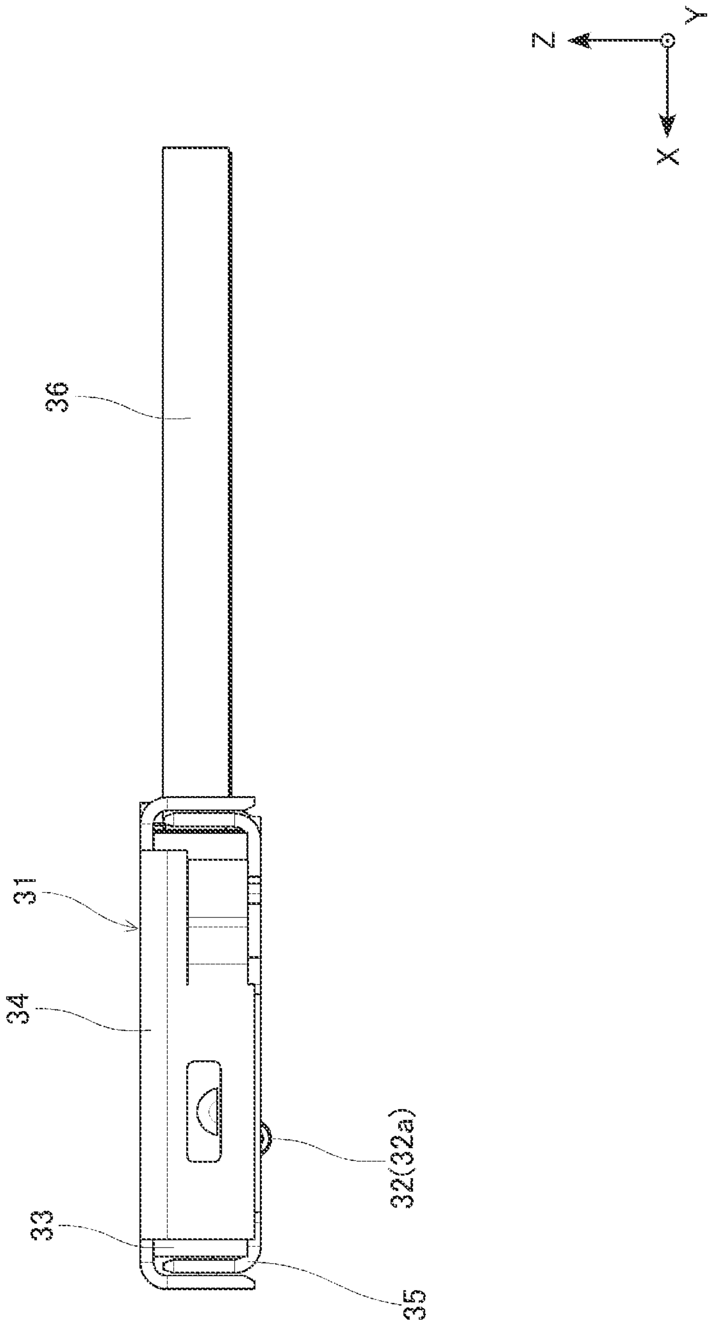
FIG. 9 is a right side view of the compression connector according to the first embodiment.

As shown in, in particular, FIGS. 7 and 8, a plurality of contacts 32 are disposed to be laterally arranged in the left-right direction.

Figure 10:
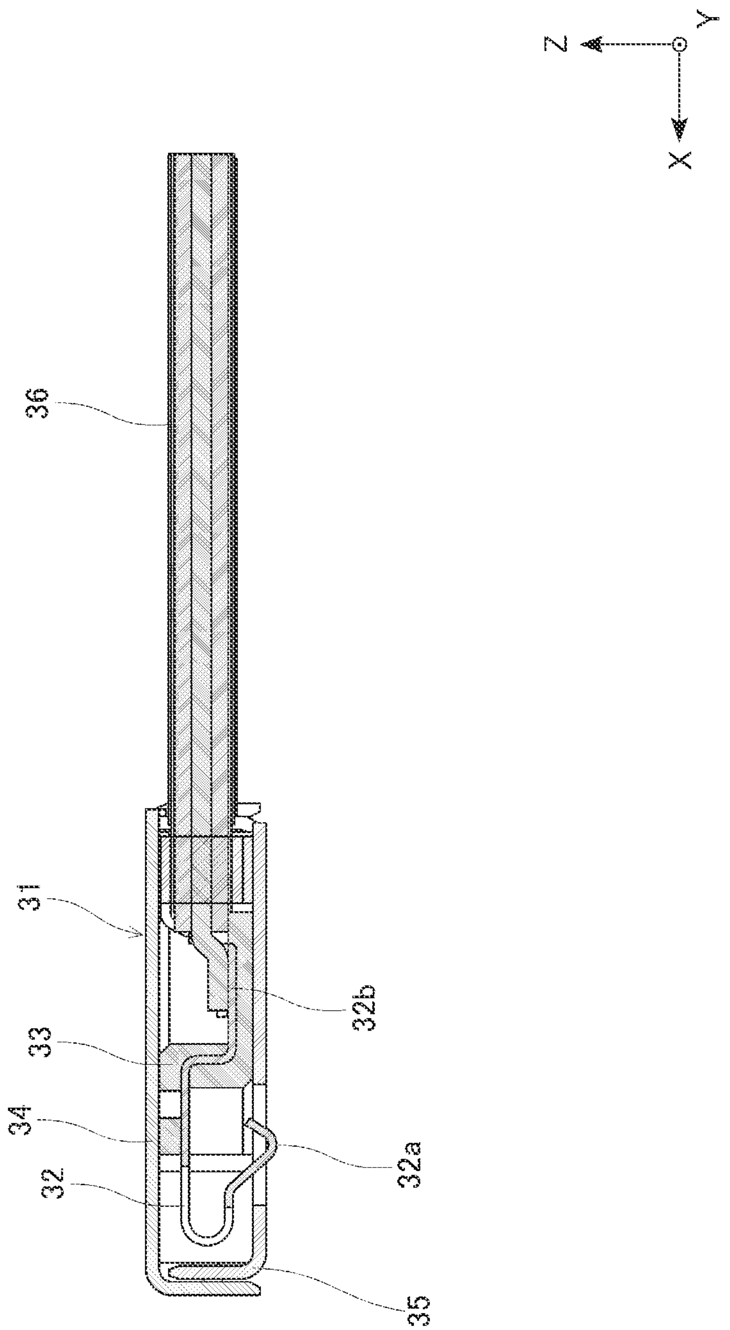
FIG. 10 is a longitudinal sectional view taken along line 10-10 in FIG. 8.
Figure 11:
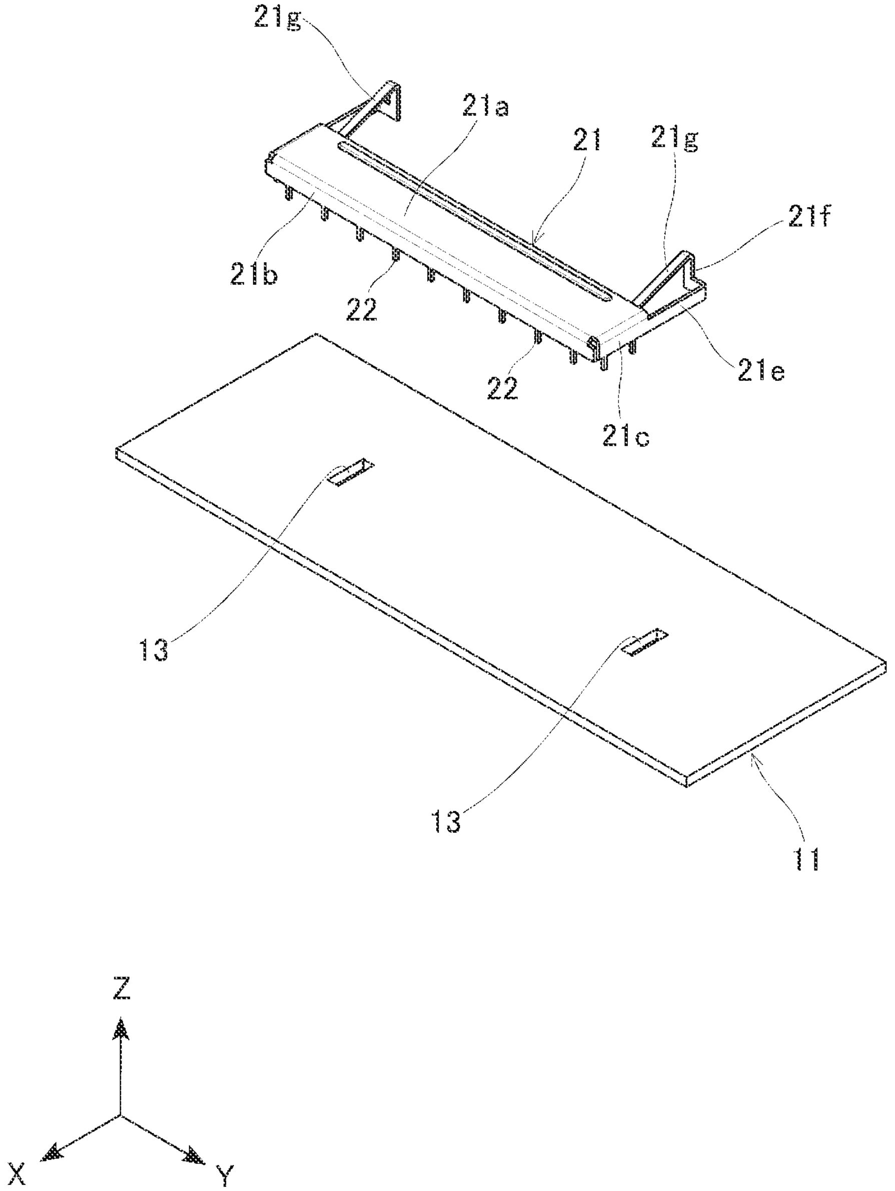
FIG. 11 is an exterior perspective view of a state in which a cage is detached from a substrate in the connector with substrate according to the first embodiment, the state being viewed from the front upper right.
Figure 12:
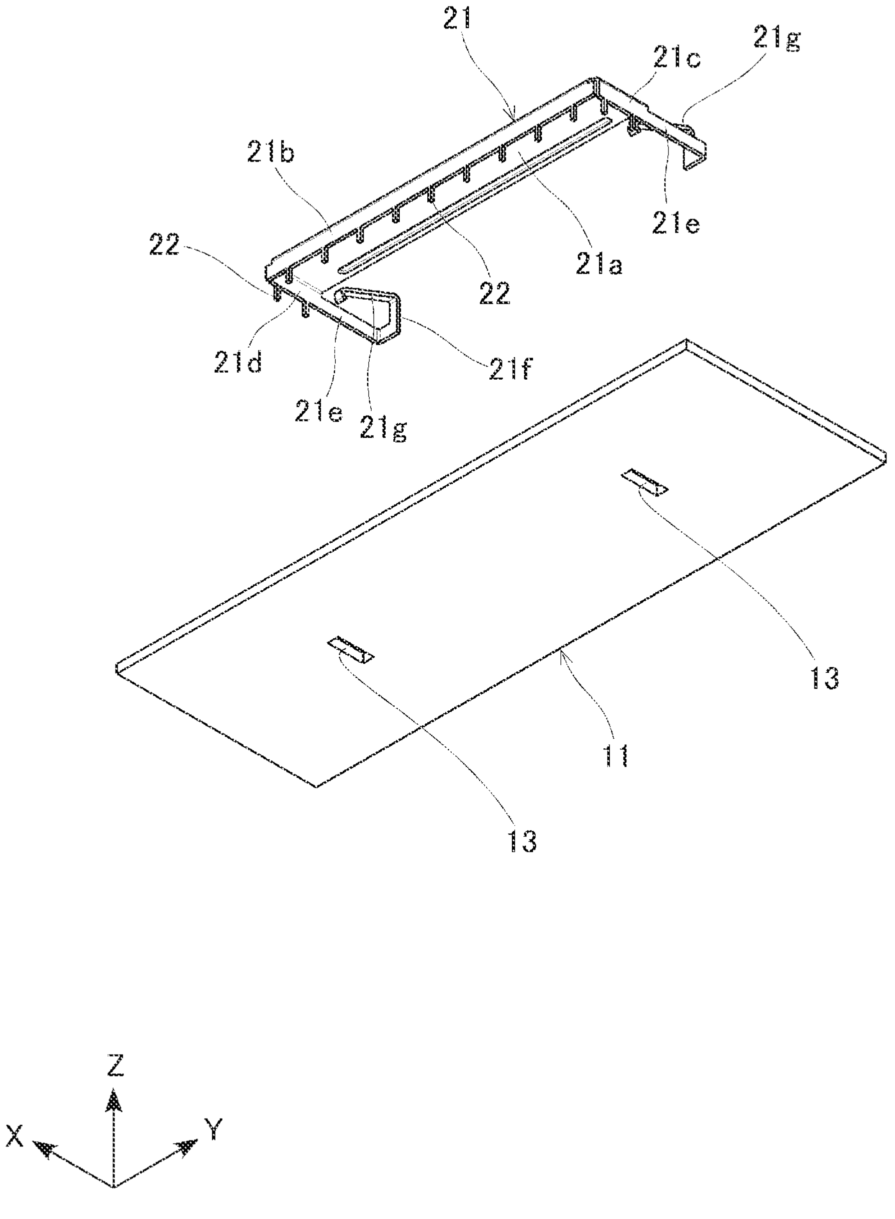
FIG. 12 is an exterior perspective view of the state in which the cage is detached from the substrate in the connector with substrate according to the first embodiment, the state being viewed from the front lower right.
Figure 13:
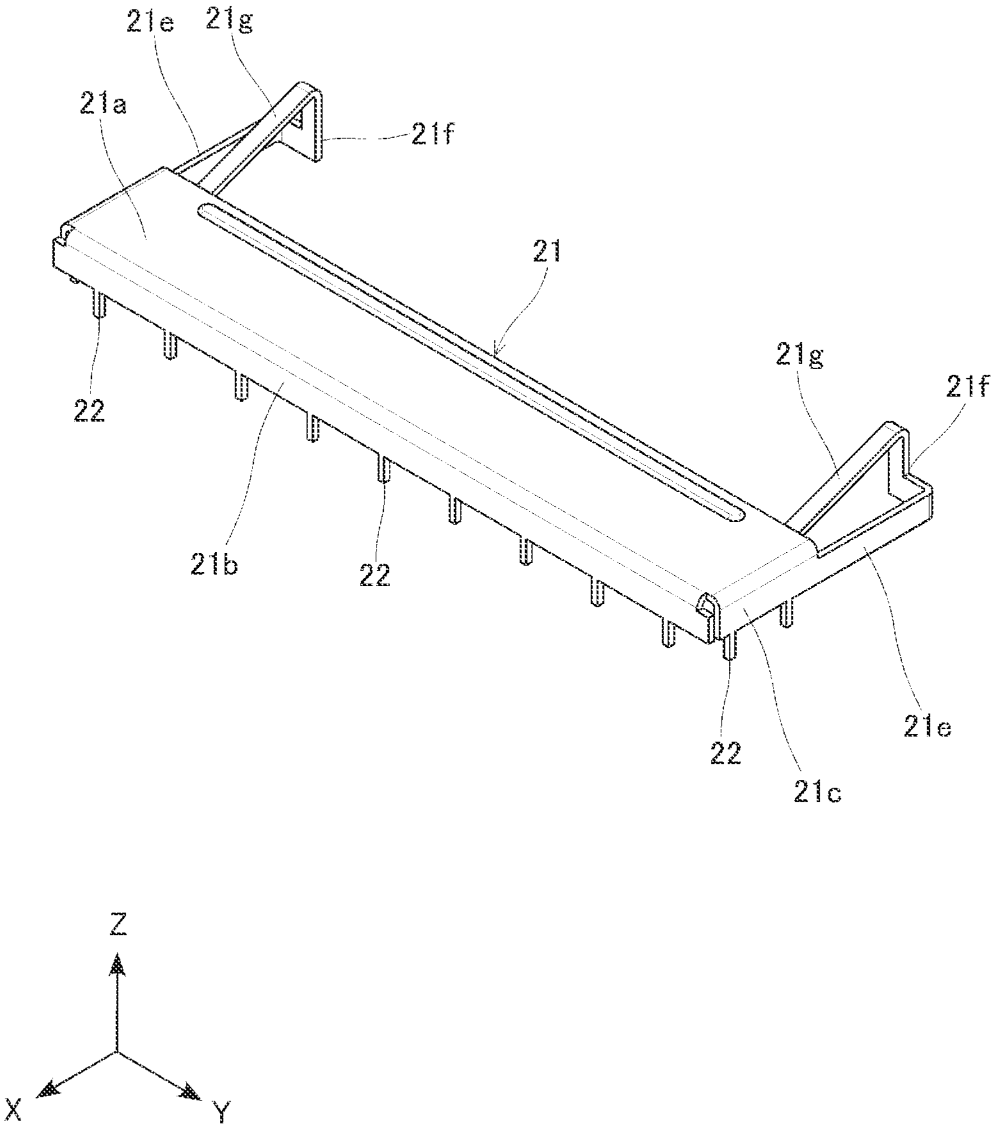
FIG. 13 is an exterior perspective view of the cage included in the connector with substrate according to the first embodiment viewed from the front upper right.
Figure 14:
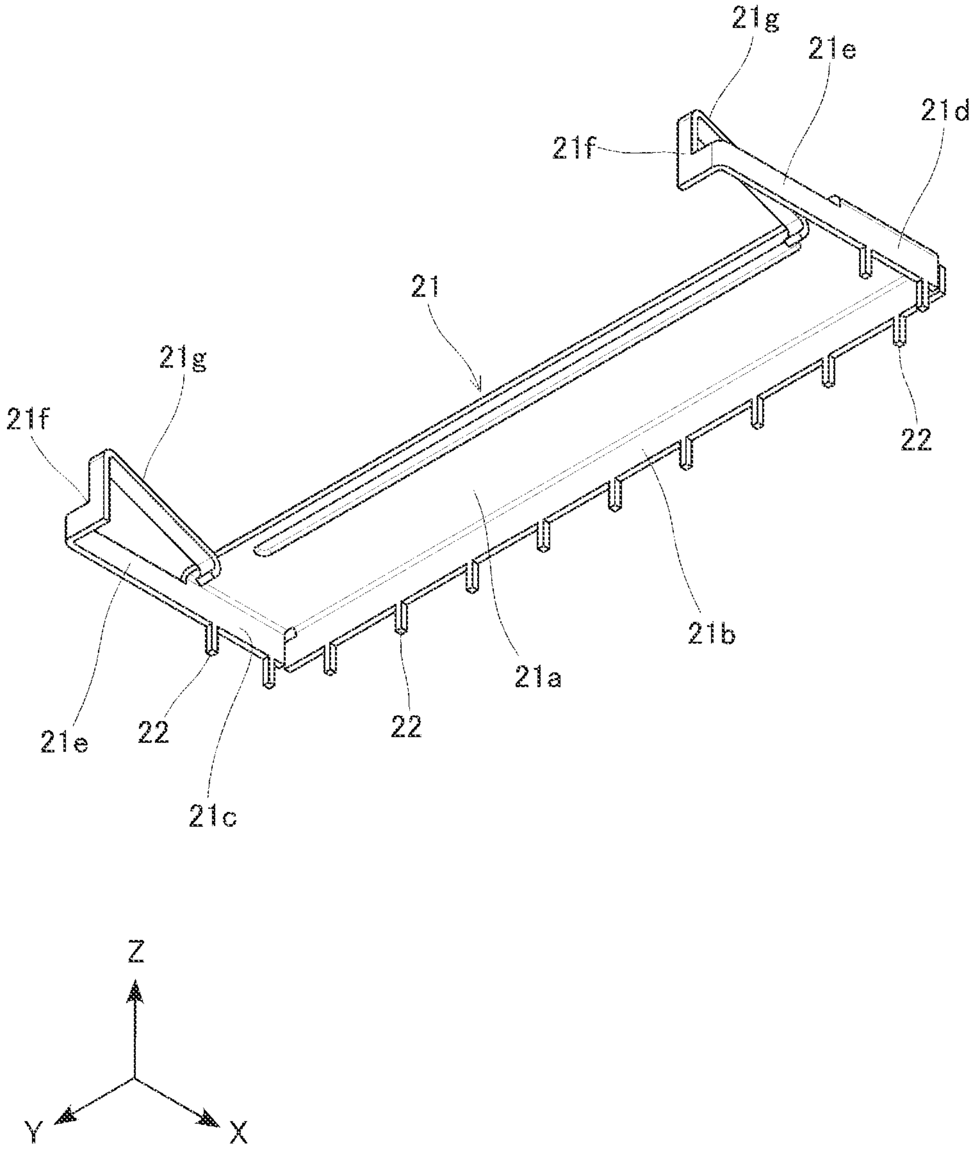
FIG. 14 is an exterior perspective view of the cage included in the connector with substrate according to the first embodiment viewed from the rear lower left.
Figure 15:
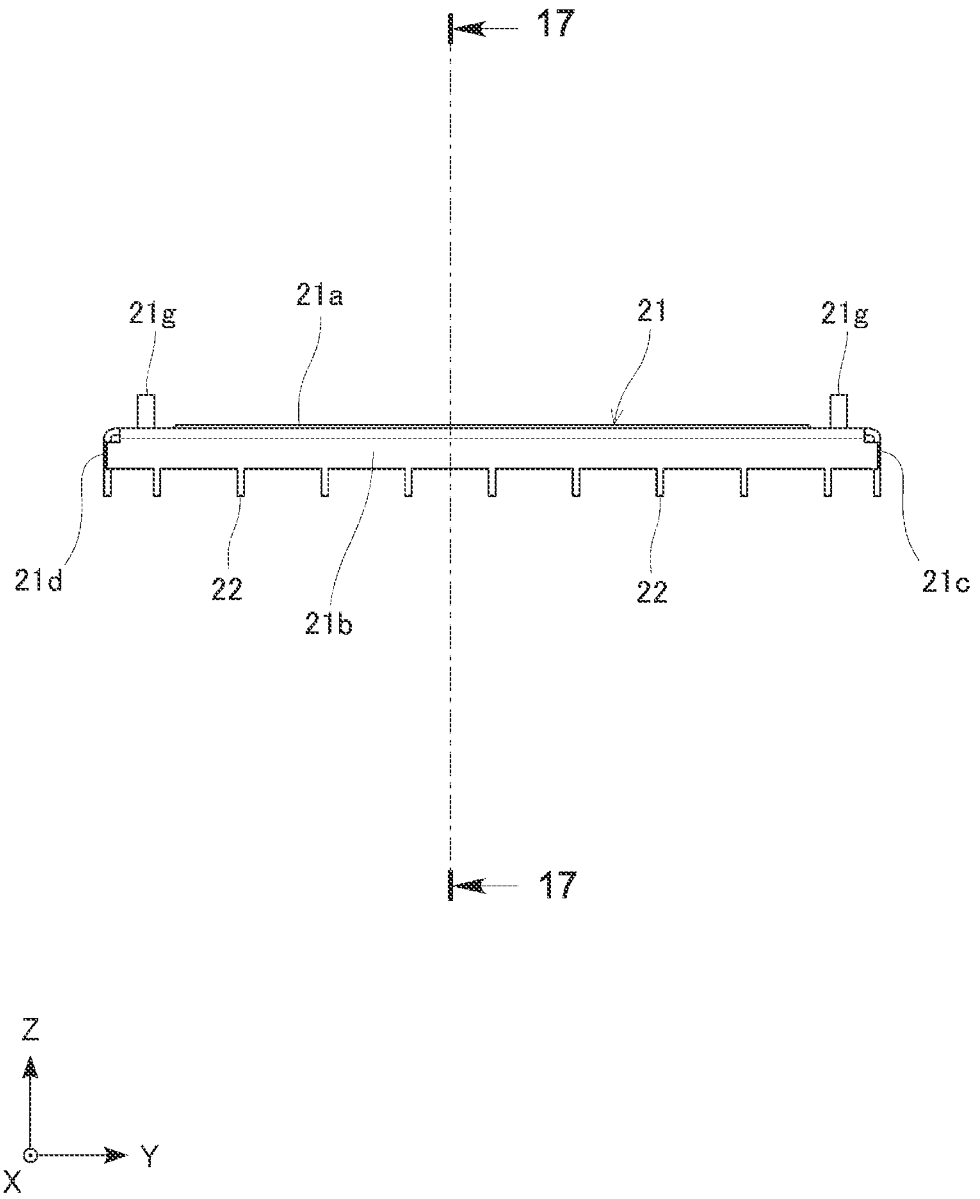
FIG. 15 is a front view of the cage included in the connector with substrate according to the first embodiment.
Figure 16:
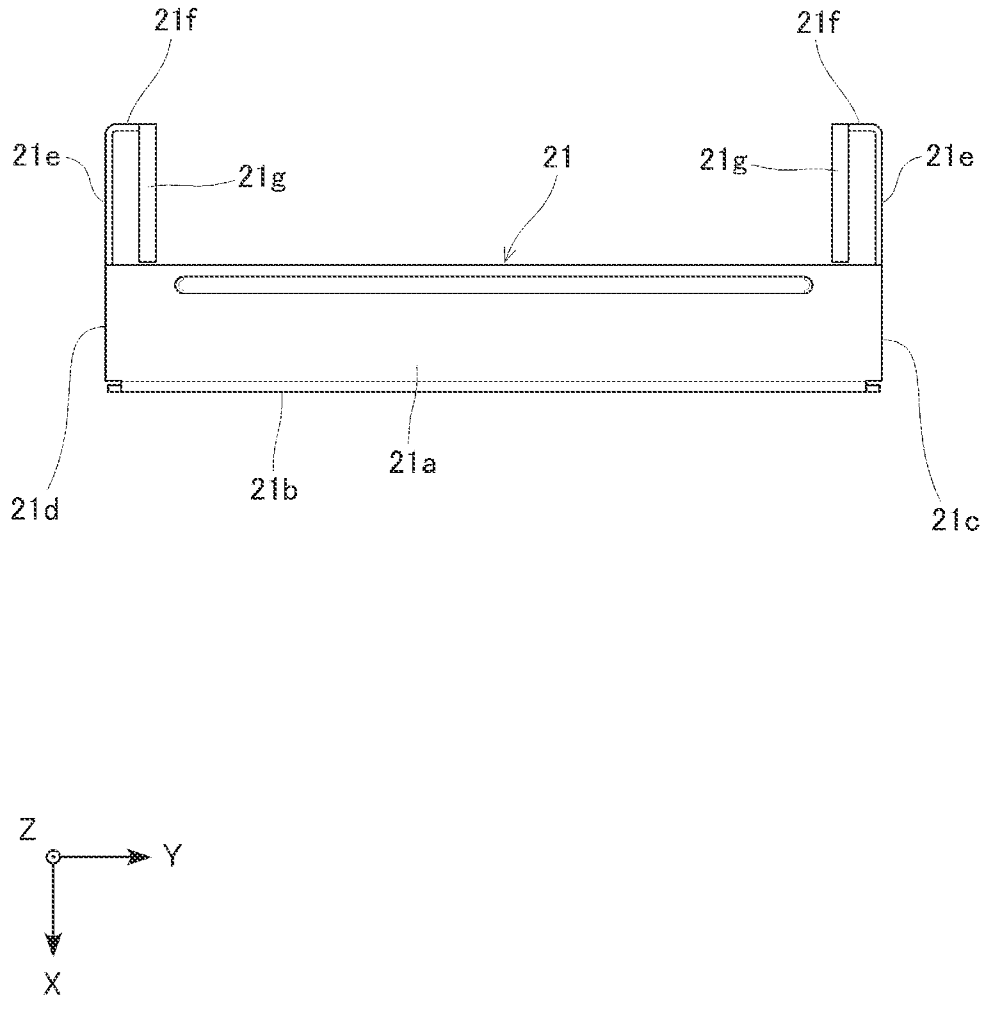
FIG. 16 is a top view of the cage included in the connector with substrate according to the first embodiment.
Figure 17:
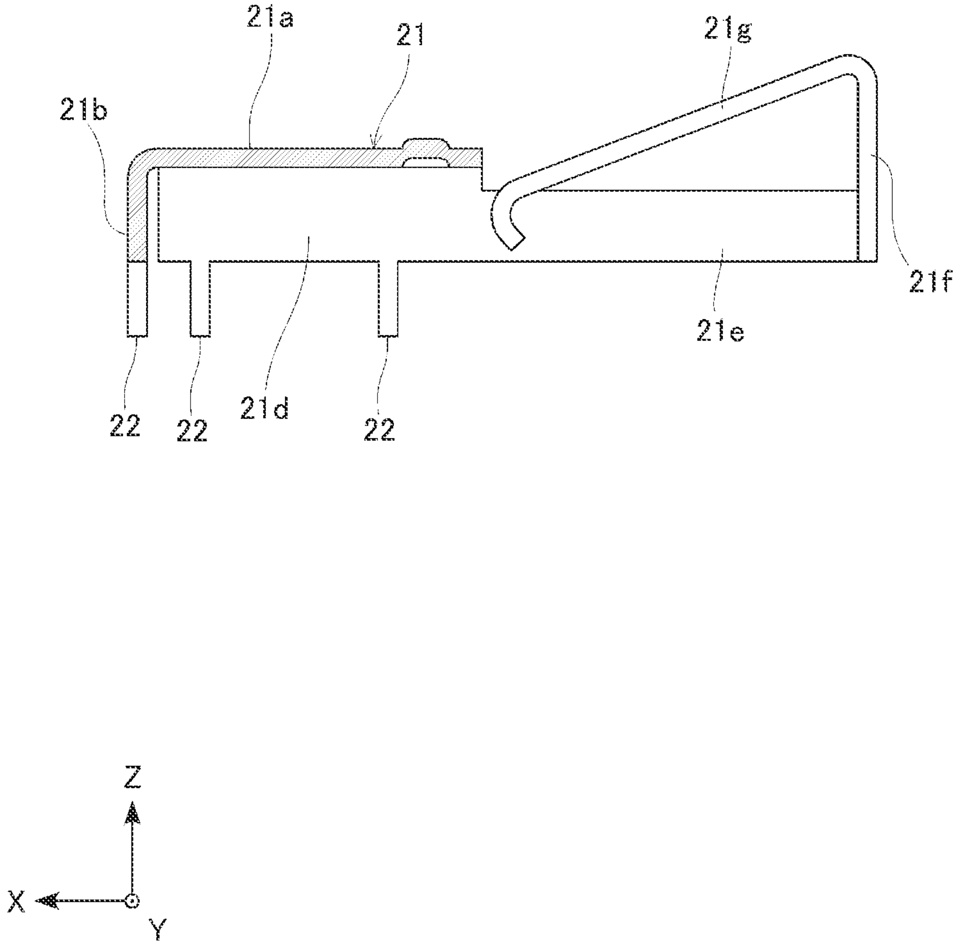
FIG. 17 is a longitudinal sectional view taken along line 17-17 in FIG. 15.

Each of the plurality of contacts 32 is fixed to the housing 33 as shown in FIG. 10. A front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 10). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, a rear end portion 32*b* of the contact 32 has a linear shape extending straight. As shown in FIG. 10, an electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Note that, concerning the members configuring the compression connector 31 in the first embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 10 according to the first embodiment is explained above. Subsequently, a method of attaching the compression connector 31 to and a method of detaching the compression connector 31 from the substrate 11 attached with the cage 21 configuring the connector with substrate 10 according to the first embodiment are explained.

Figure 18:
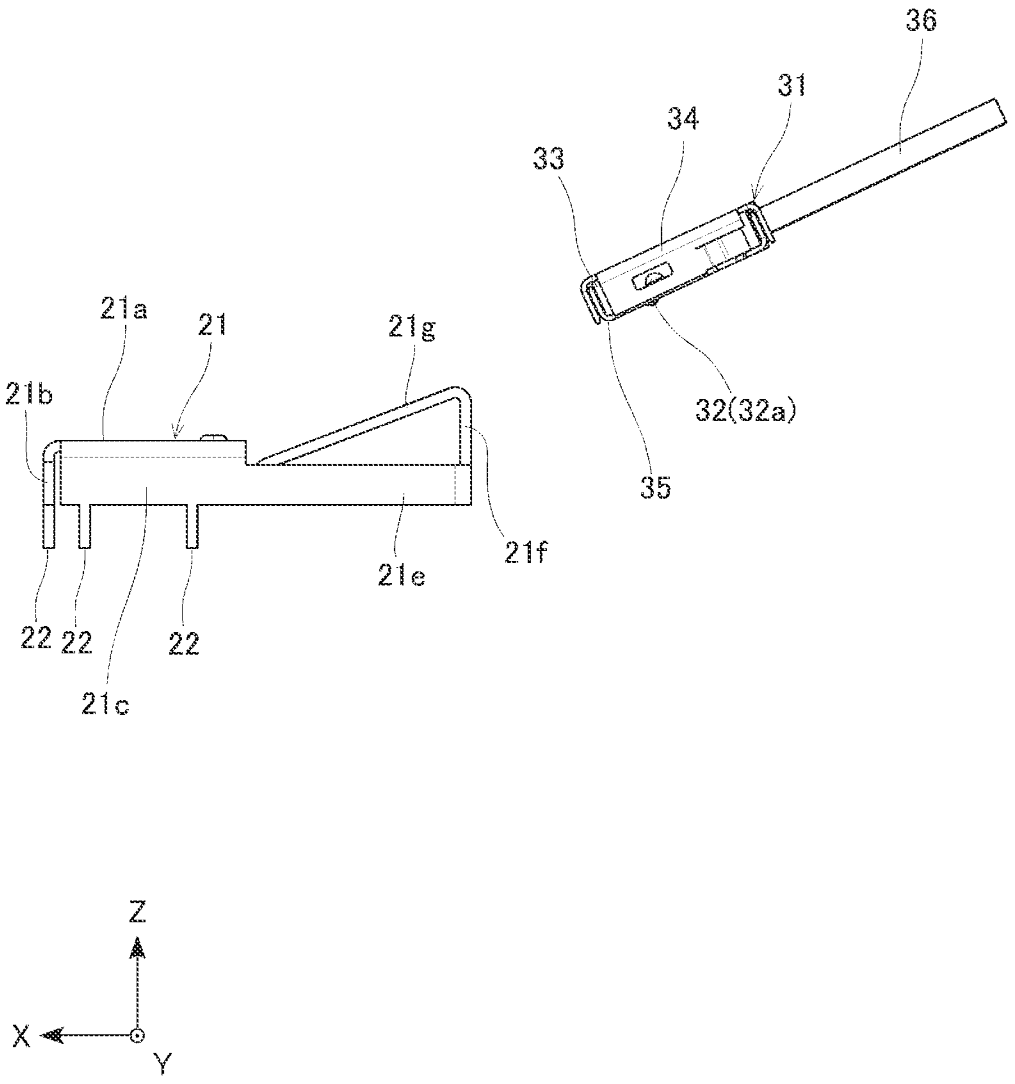
FIG. 18 is a right side view showing a posture state at the time when the compression connector is inserted into the cage included in the connector with substrate according to the first embodiment.
Figure 19:
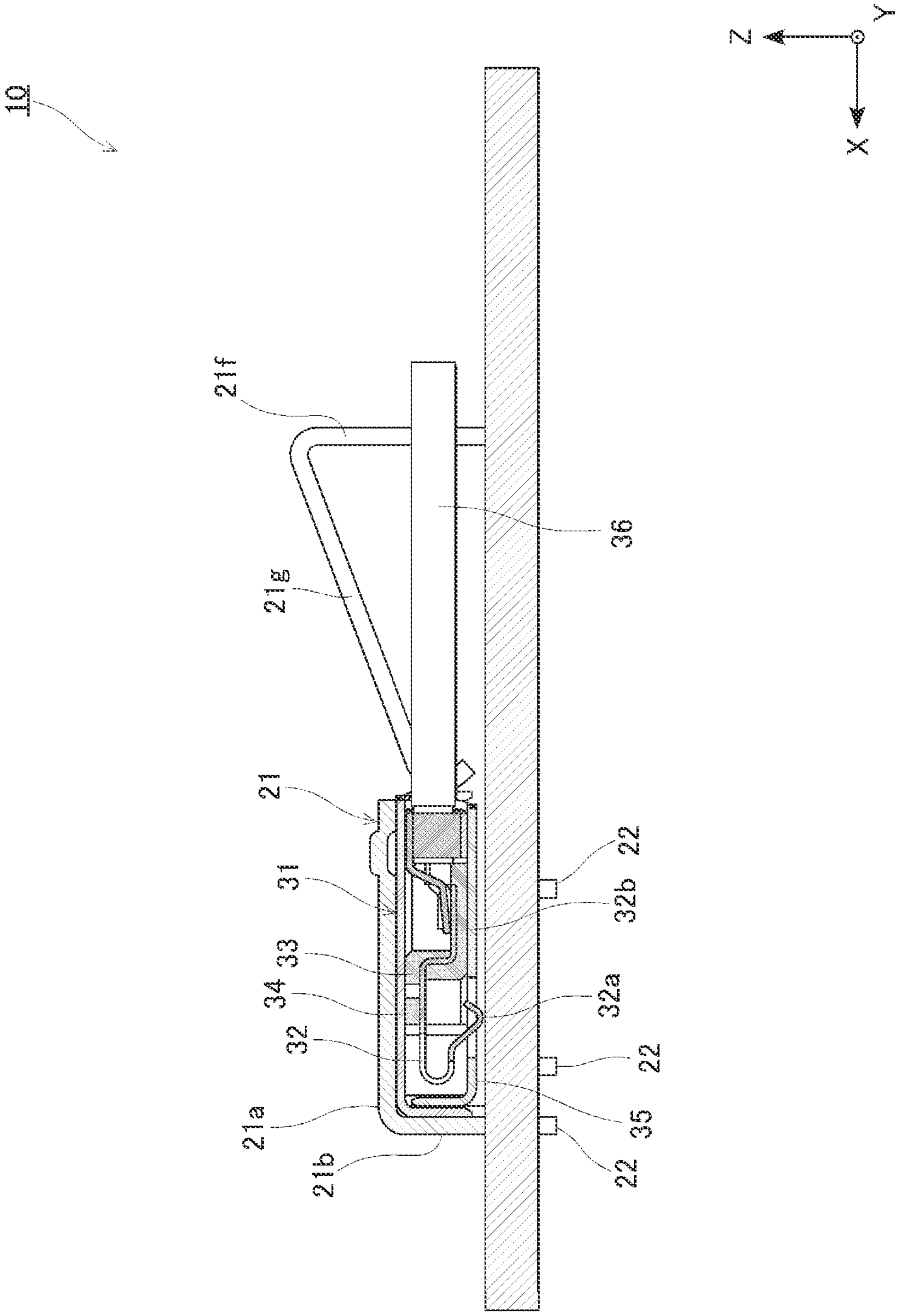
FIG. 19 is a reference diagram showing a longitudinal cross section of the connector with substrate according to the first embodiment, the reference diagram showing a state in which the compression connector is inserted into and installed in the substrate attached with the cage.

As shown in FIG. 18, when the compression connector 31 is attached to the substrate 11 attached with the cage 21, the compression connector 31 is guided in an oblique direction according to an angle of the forward descent of the spring pieces 21*g* included in the cage 21. When the compression connector 31 is inserted toward the cage 21, the compression connector 31 applies, to the spring pieces 21*g*, downward external force resisting an elastic force exerted by the spring pieces 21*g*. The spring pieces 21*g* to which the downward external force is applied bend downward. However, since the opening sections 13 are formed in positions of the substrate 11 below the distal ends of the spring pieces 21*g*, the distal ends of the spring pieces 21*g* enter the insides of the opening sections 13. Therefore, the spring pieces 21*g* always apply, as reaction, an upward elastic force to the compression connector 31 that applies the external force. Further, when the compression connector 31 is inserted toward the cage 21 and, finally, the compression connector 31 is completely housed in the region surrounded by the top surface 21*a*, the vertical front surface 21*b*, the vertical right side surface 21*c*, and the vertical left side surface 21*d* in the cage 21 and the upper surface of the substrate 11, the spring pieces 21*g* are released from the external force applied from the compression connector 31 and the distal ends of the spring pieces 21*g* slip off the opening sections 13 and move to upper positions. This state is shown in FIG. 19. In the state shown in FIG. 19, the distal ends of the spring pieces 21*g* are present in the position of the rear center of the compression connector 31 completely inserted into and installed in the cage 21. Therefore, the spring pieces 21*g* exert a function of hindering the compression connector 31 from moving in a slipping-off direction to the rear side with respect to the cage 21. That is, the spring pieces 21*g* according to the first embodiment exert the function of guidance in obliquely inserting the compression connector 31 into the cage 21 and the function of the slip-off prevention.

The compression connector 31 inserted into and fixed to the substrate 11 attached with the cage 21 applies, to the substrate 11, contact reaction in the vertical direction applied by the plurality of contacts 32 included in the compression connector 31. However, the contact reaction in the vertical direction applied by the plurality of contacts 32 is received by, in particular, the top surface 21*a* configuring the upper surface of the cage 21 in the cage 21 that houses the compression connector 31. Further, since the spring pieces 21*g* exert the function of the slip-off prevention for the compression connector 31, a stable fixed state of the compression connector 31 to the substrate 11 is maintained.

On the other hand, when the compression connector 31 is detached from the substrate 11 attached with the cage 21 in the state shown in FIG. 19, a user can detach the compression connector 31 from the substrate 11 attached with the cage 21 by pushing the spring pieces 21*g* downward to release the slip-off prevention function of the compression connector 31 and pulling the compression connector 31 from the cage 21 obliquely upward to the rear from that state.

As explained above, in the connector with substrate 10 according to the first embodiment, by using the spring pieces 21*g* functioning as the elastic body that is formed in the cage 21 and applies the elastic force, it is possible to obtain a simple and secure fixed state of the compression connector 31 to the substrate 11 attached with the cage 21. Since the spring pieces 21*g* functioning as the elastic body that applies the elastic force are members formed in the cage 21, the spring pieces 21*g* are not dropped or lost unlike the screws and the nuts of the related art. Further, since the connector with substrate 10 contains a mechanism for fixing the compression connector 31 with the elastic force exerted by the spring pieces 21*g*, unlike with the related art, work manhours involving attachment are reduced and torque management for the screws is unnecessary. That is, with the connector with substrate 10 according to the first embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the first embodiment. Various changes or improvements can be added to the first embodiment.

For example, in the first embodiment explained above, an example of the case in which the spring pieces 21*g* functioning as the elastic body that applies the elastic force are formed for the cage 21 is explained. However, the elastic body that applies the elastic force may be formed for the compression connector 31.

The configuration of the connector with substrate 10 according to the first embodiment is explained above with reference to FIGS. 1 to 19. Subsequently, a connector with substrate 100 according to a second embodiment, which is another form example that the connector with substrate according to the present invention can take, is explained with reference to FIGS. 20 to 35. Note that, in the following explanation, members that are the same as or similar to the members explained in the first embodiment above are denoted by the same reference numerals and signs and explanation of the members is sometimes omitted.

Second Embodiment

Figure 20:
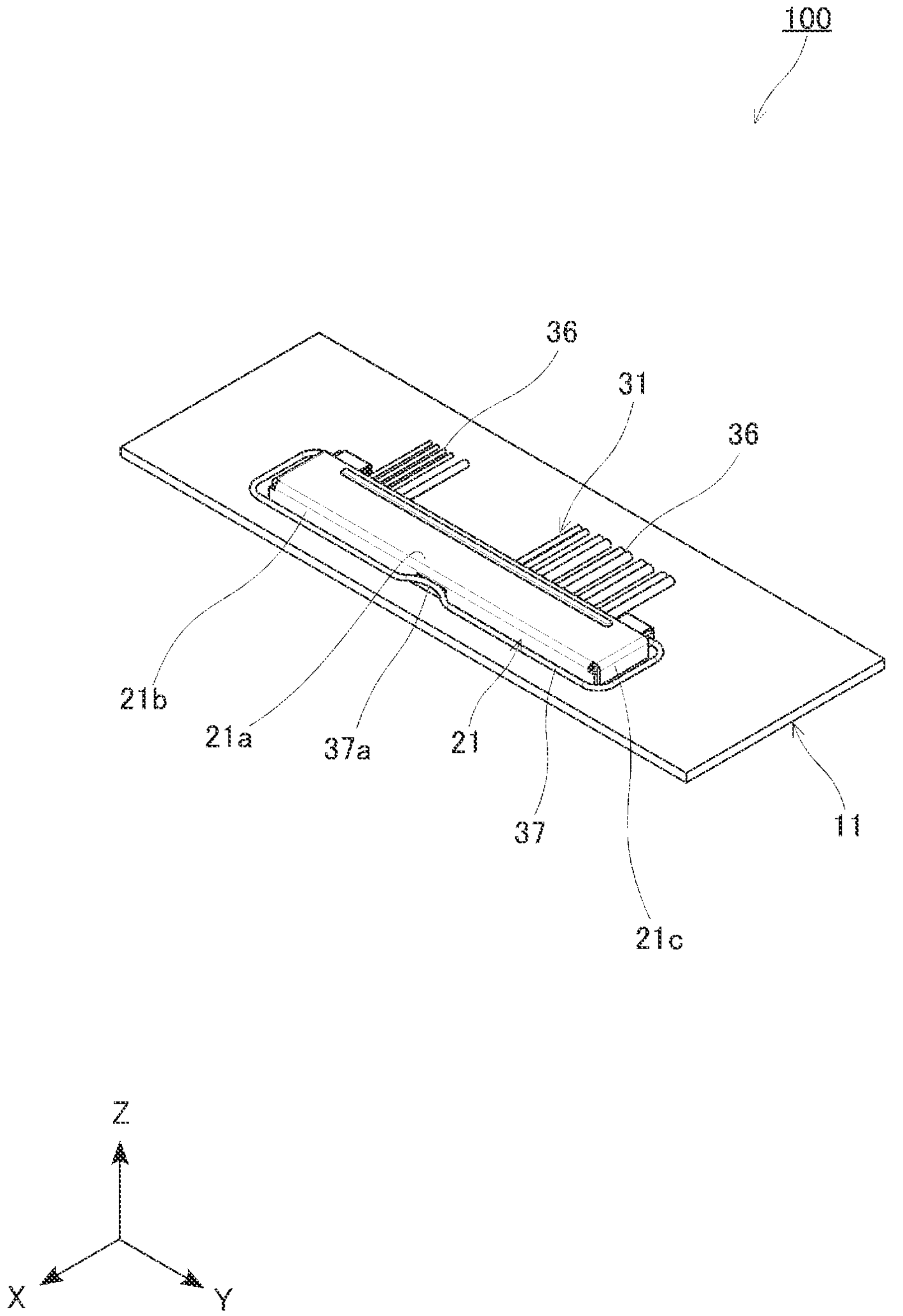
FIG. 20 is an exterior perspective view of a connector with substrate according to a second embodiment viewed from the front upper right.
Figure 21:
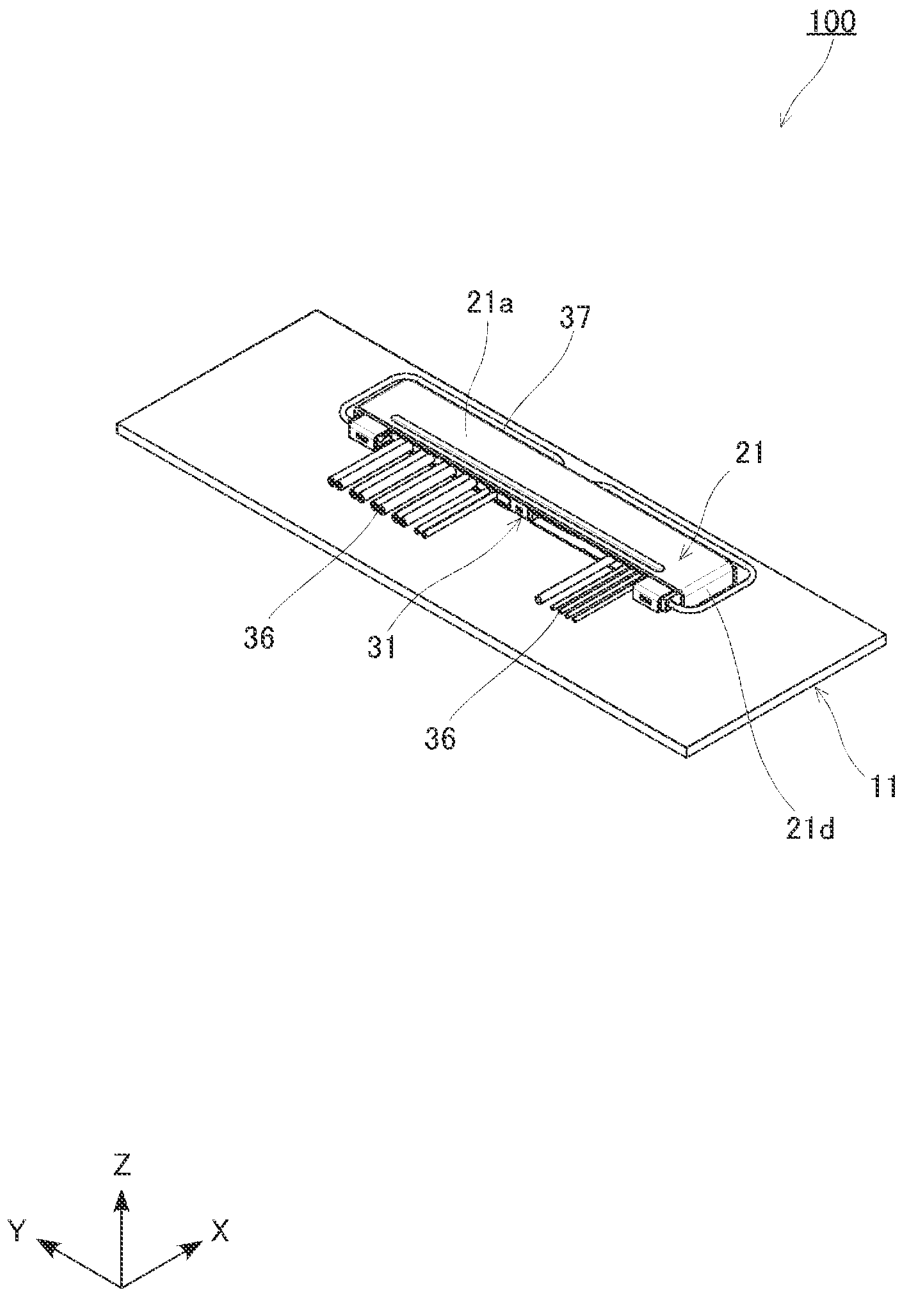
FIG. 21 is an exterior perspective view of the connector with substrate according to the second embodiment viewed from the rear upper left.

A configuration of the connector with substrate 100 according to the second embodiment is explained with reference to FIGS. 20 to 35. The connector with substrate 100 according to the second embodiment includes, as shown in FIGS. 20 to 22, the substrate 11, the cage 21 installed on the upper surface of the substrate 11, and the compression connector 31 attached to the substrate 11 via the cage 21.

The substrate 11 includes a not-shown printed circuit and the like. The substrate 11 and the compression connector 31 are electrically connected via the cage 21 attached to the upper surface of the substrate 11 to be configured to be able to deliver an electric signal, power supply power, and the like.

Figure 22:
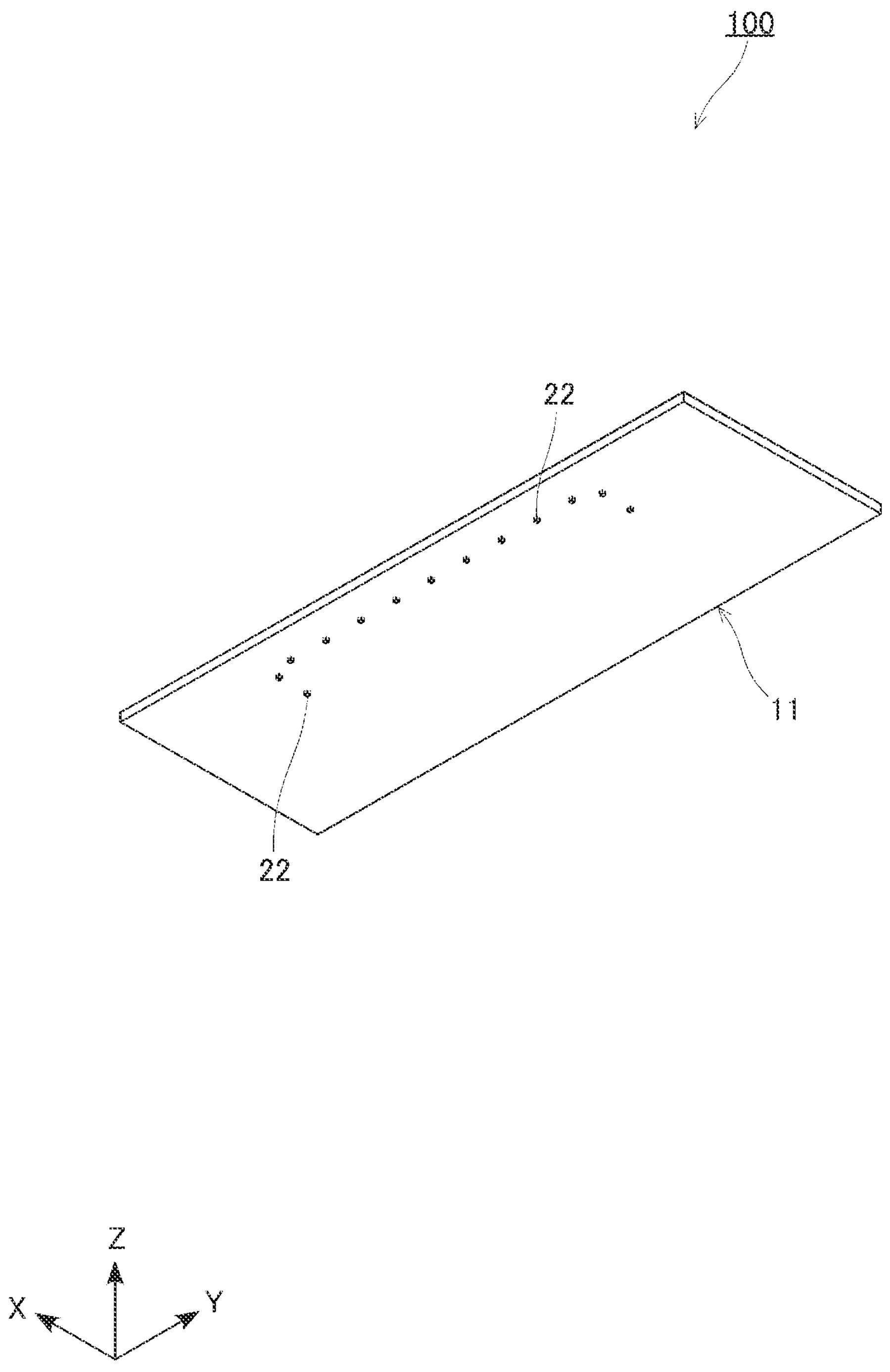
FIG. 22 is an exterior perspective view of the connector with substrate according to the second embodiment viewed from the front lower right.

A plurality of attachment holes (not shown) are formed in the substrate 11 (see FIG. 22). The plurality of leg sections 22 included in the cage 21 explained below are inserted into the plurality of (in the second embodiment, assumed to be thirteen) attachment holes (not shown) to fix the cage 21 to the substrate 11.

Figure 31:
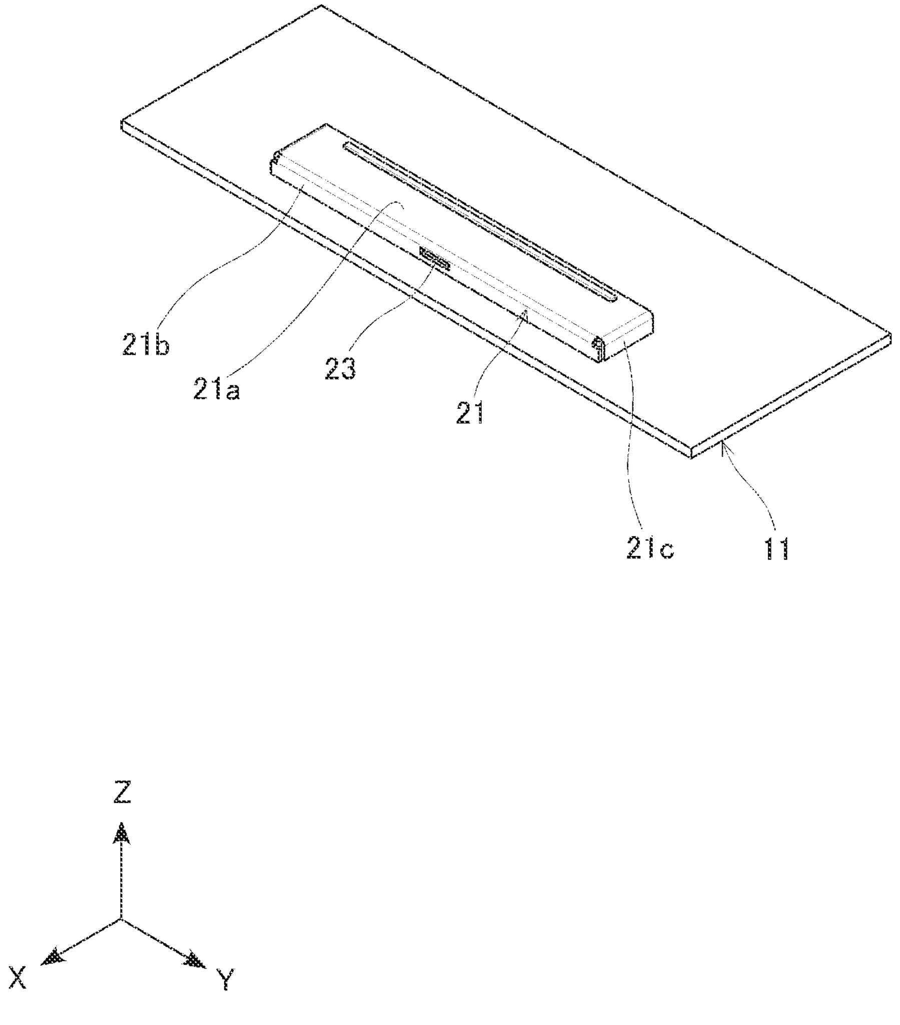
FIG. 31 is an exterior perspective view of the substrate attached with the cage included in the connector with substrate according to the second embodiment viewed from the front upper right.
Figure 32:
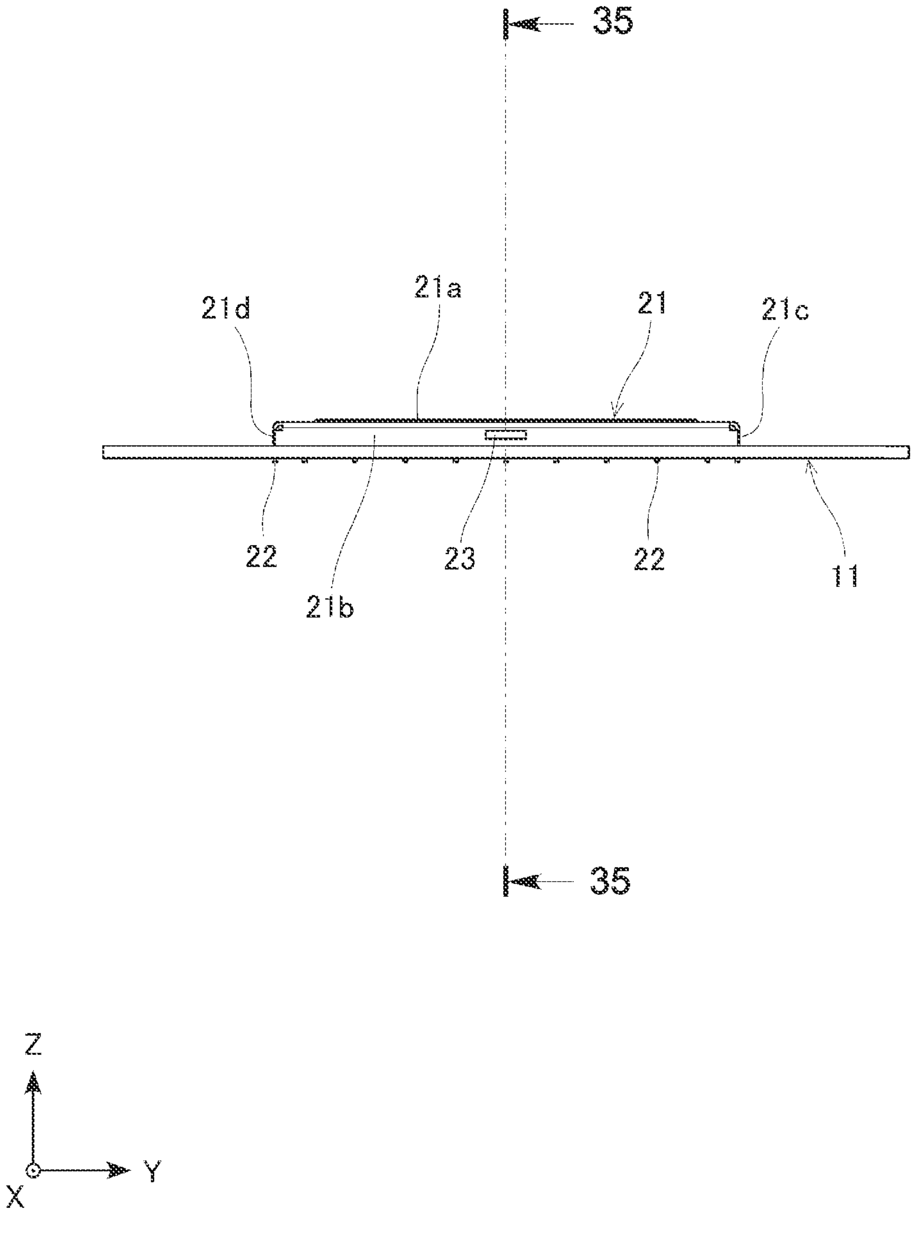
FIG. 32 is a front view of the substrate attached with the cage included in the connector with substrate according to the second embodiment.
Figure 33:
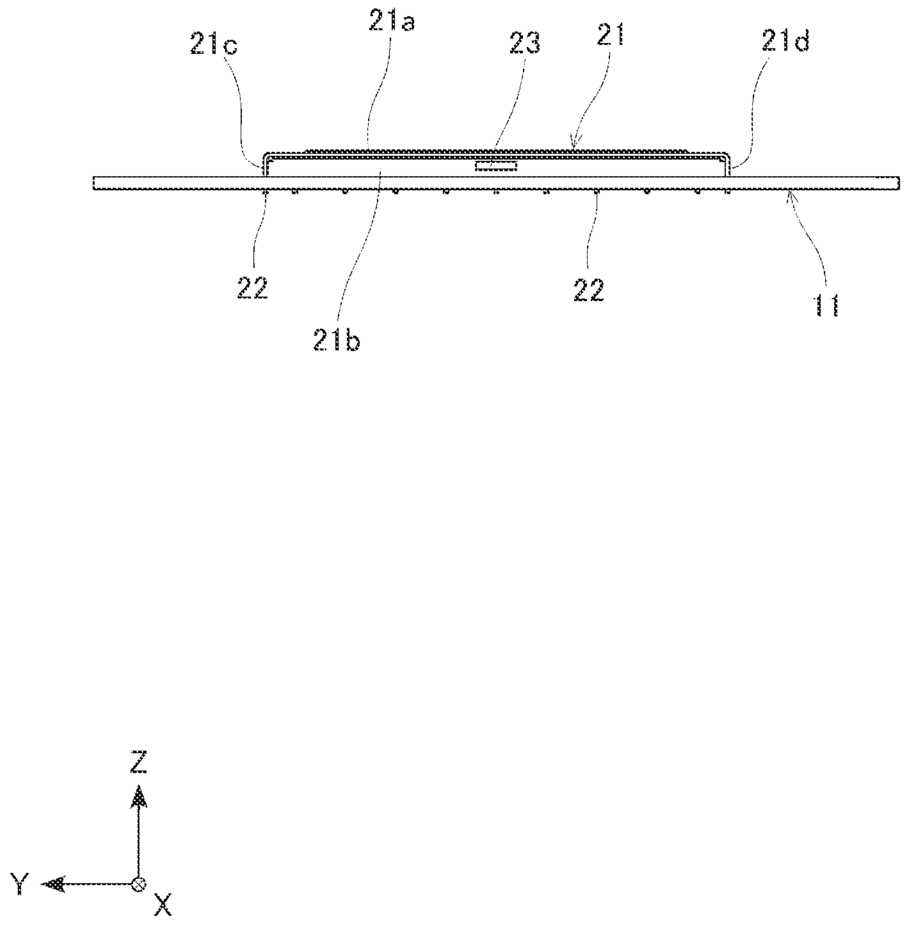
FIG. 33 is a rear view of the substrate attached with the cage included in the connector with substrate according to the second embodiment.
Figure 34:
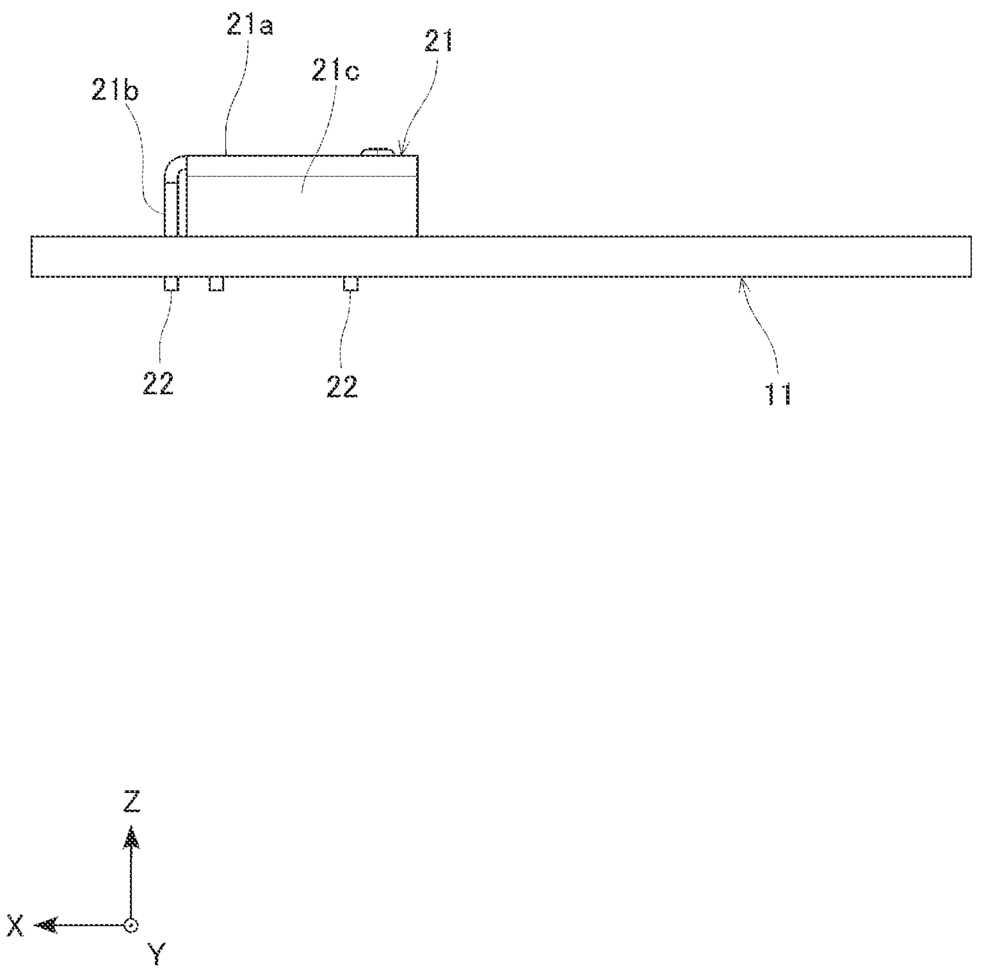
FIG. 34 is a right side view of the substrate attached with the cage included in the connector with substrate according to the second embodiment.
Figure 35:
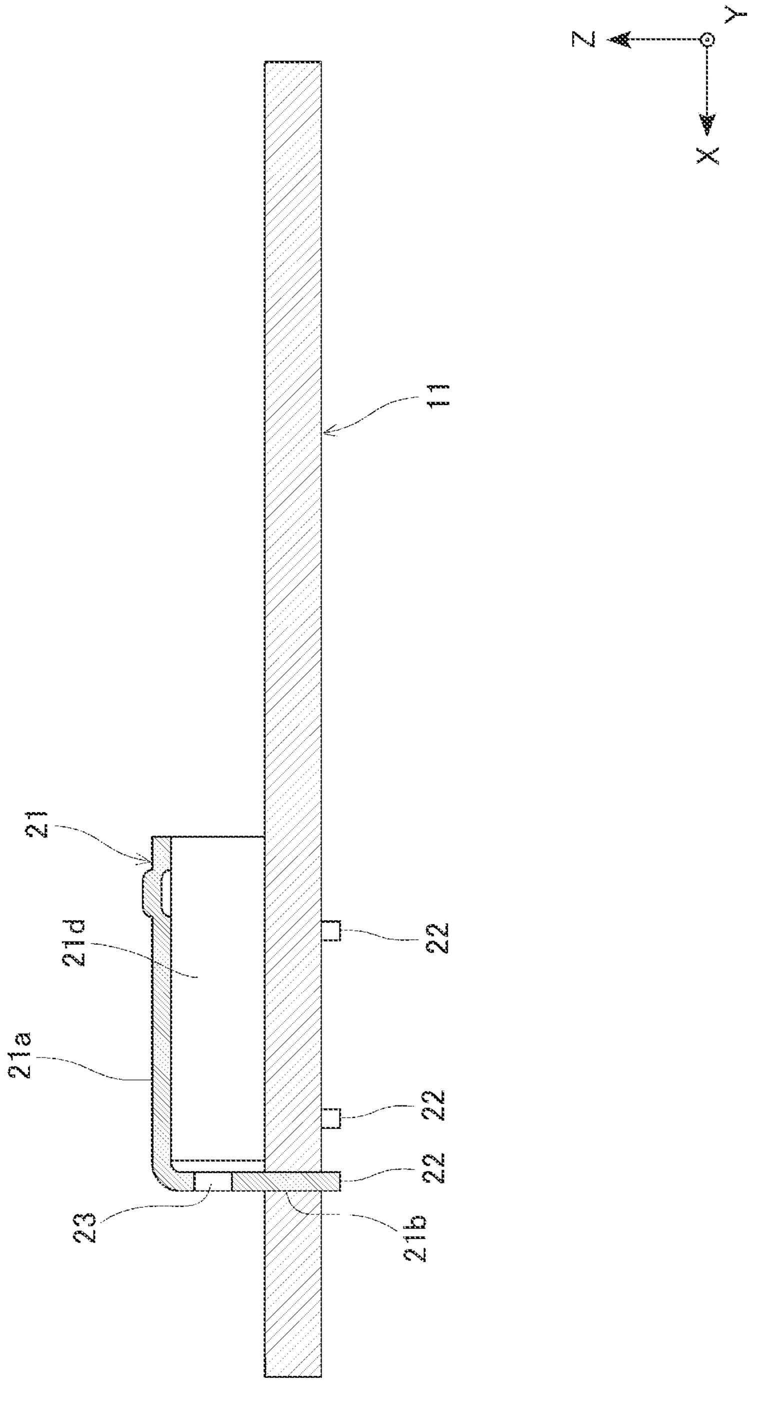
FIG. 35 is a longitudinal sectional view taken along line 35-35 in FIG. 32.
Figure 36:
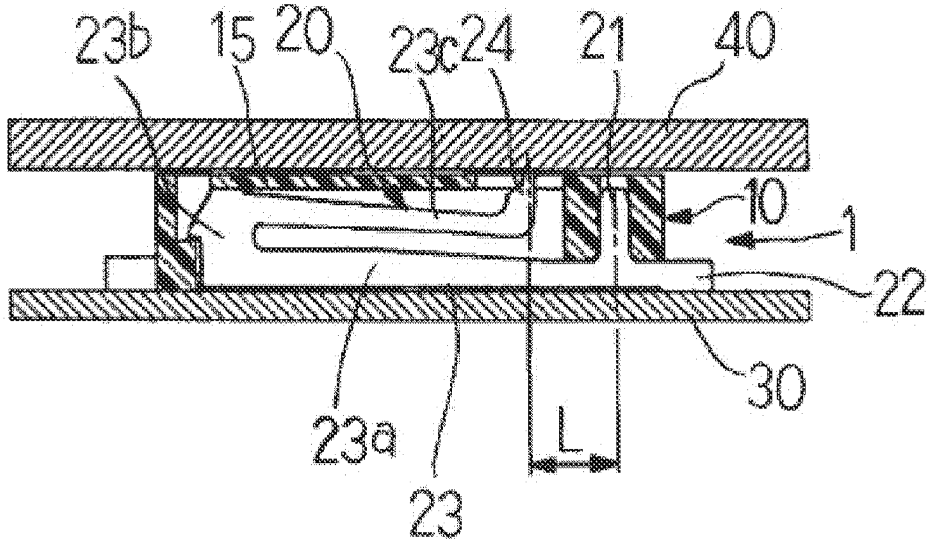
FIG. 36 is a sectional view showing a state in which a connector of a compression type of the related art is disposed between circuit boards.

As shown in FIGS. 31 and 35, the cage 21 is a member formed by bending a flat metal plate material and includes the top surface 21*a* forming an upper surface and the vertical front surface 21*b*, the vertical right side surface 21*c*, and the vertical left side surface 21*d* formed as the vertical surface of the present invention by being bent vertically from the front and the left and right side surfaces of the top surface 21*a*. A region surrounded by the top surface 21*a*, the vertical front surface 21*b*, the vertical right side surface 21*c*, the vertical left side surface 21*d*, and the upper surface of the substrate 11 is a region where the compression connector 31 is housed and installed.

The plurality of (in the second embodiment, thirteen) leg sections 22 are formed on the lower end faces of the vertical front surface 21*b*, the vertical right side surface 21*c*, and the vertical left side surface 21*d*. The leg sections 22 are formed as shaft-like members extending downward. The plurality of leg sections 22 are inserted into the plurality of attachment holes (not shown) formed in the substrate 11, whereby secure fixing of the substrate 11 and the cage 21 is implemented. Note that, as a fixing method for the leg sections 22 and the plurality of attachment holes (not shown), the leg sections 22 and the plurality of attachment holes (not shown) may be fixed using solder, an adhesive, or the like or the leg sections 22 may be bent after being inserted into the attachment holes (not shown) to perform secure fixing.

A lock hole 23 that a lock section 37*a* of a lock lever 37 included in the compression connector 31 enter is formed in the center position of the vertical front surface 21*b*. The lock hole 23 functions as fixing means in attaching the compression connector 31 to the substrate 11 attached with the cage 21.

The compression connector 31 includes, as shown in FIGS. 25 to 30, the contacts 32 that are in contact with the substrate 11, the housing 33 to which the contacts 32 are fixed, the cover shell 34 that covers the upper surface portion of the housing 33, the bottom shell 35 that covers the lower surface portion of the housing 33, and a lock lever 37 functioning as the elastic body of the present invention rotatable in an inserting direction into the cage 21.

Figure 26:
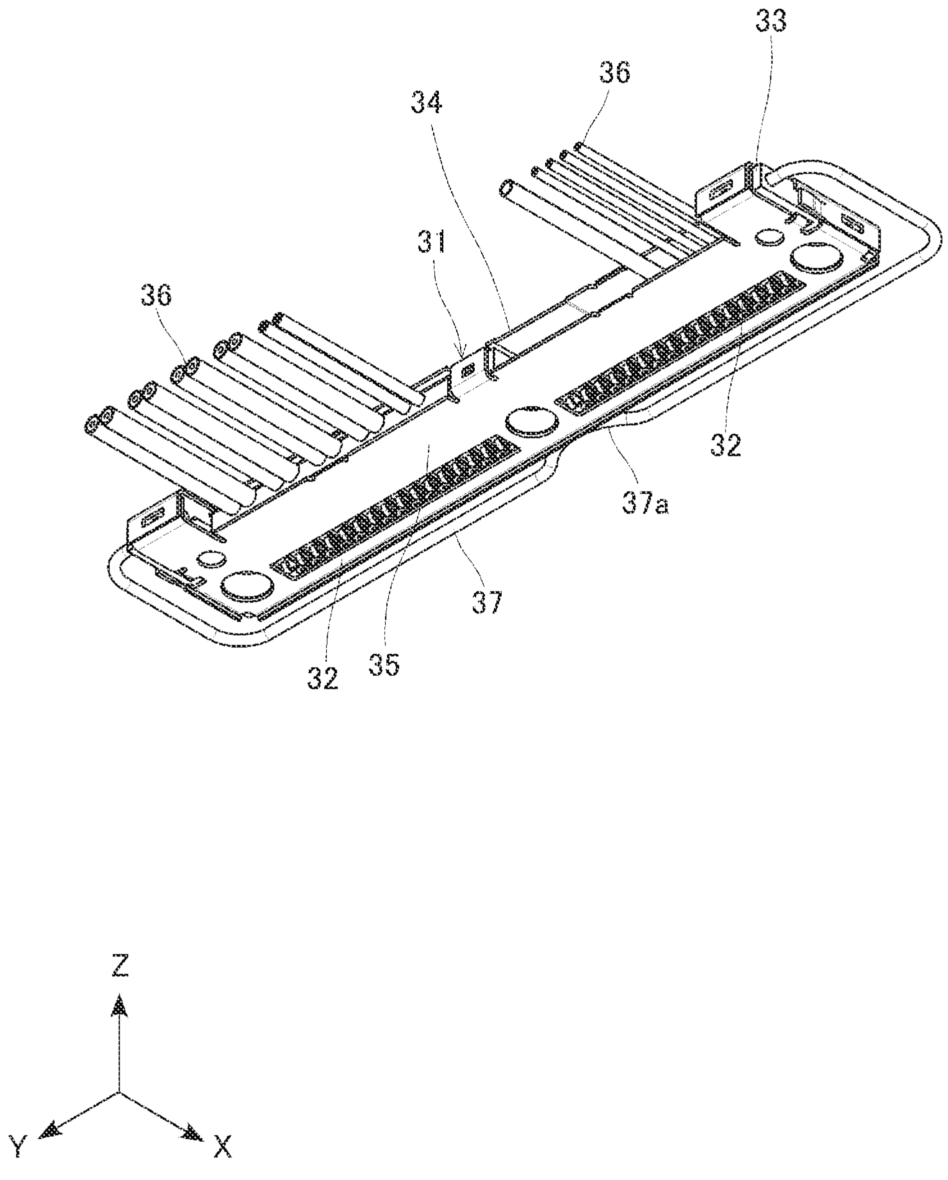
FIG. 26 is an exterior perspective view of the compression connector according to the second embodiment viewed from the rear lower left.
Figure 27:
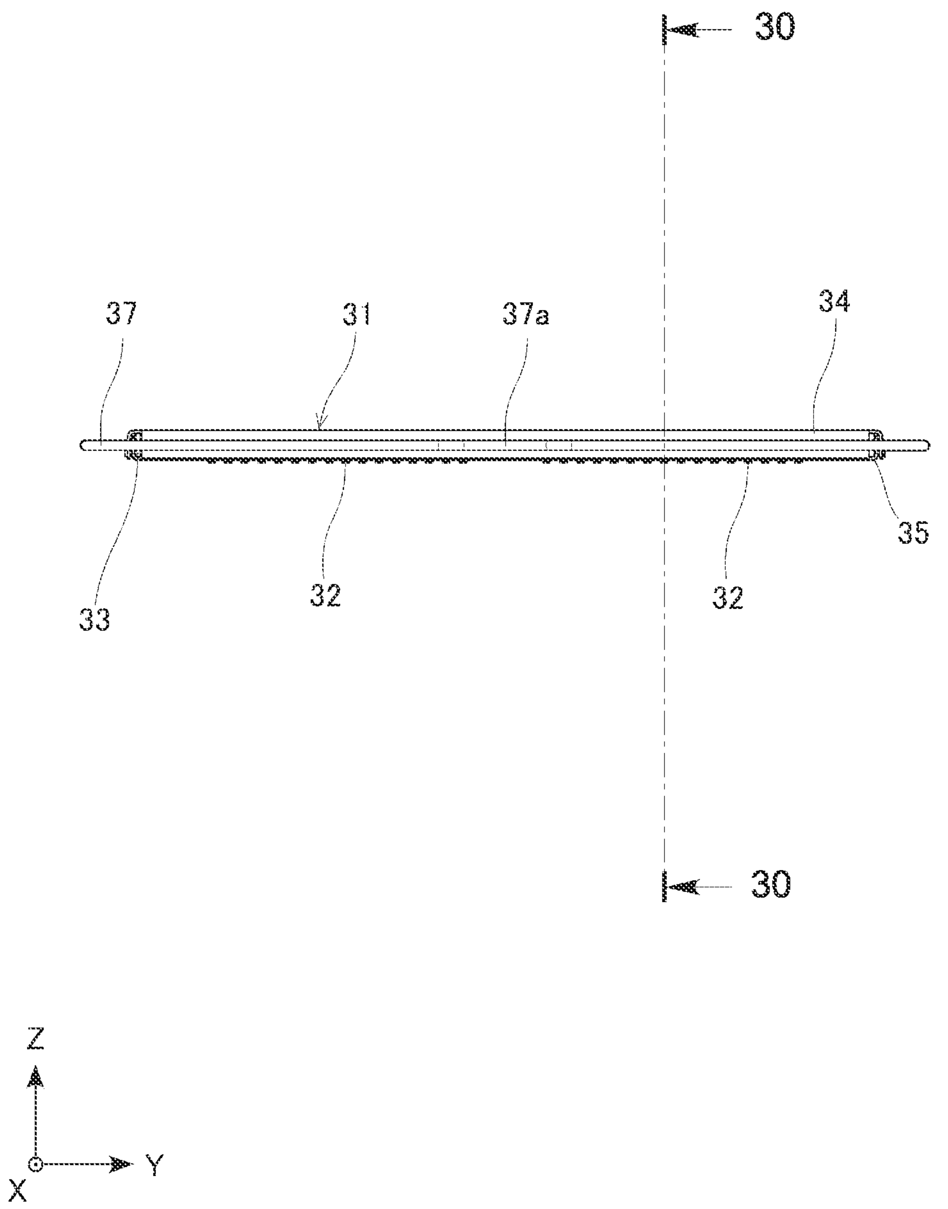
FIG. 27 is a front view of the compression connector according to the second embodiment.

As shown in, in particular, FIGS. 26 and 27, the plurality of contacts 32 are disposed to be laterally arranged in the left-right direction.

Figure 30:
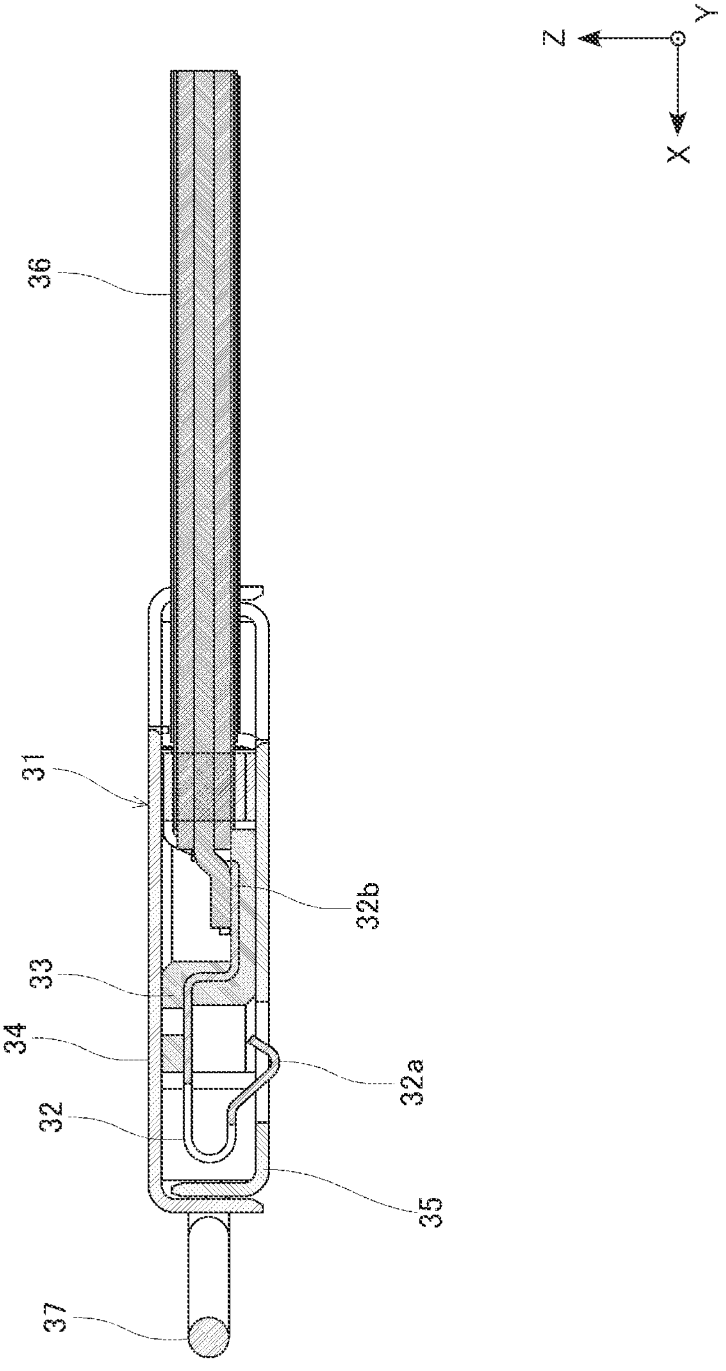
FIG. 30 is a longitudinal sectional view taken along line 30-30 in FIG. 27.

Each of the plurality of contacts 32 is fixed to the housing 33 as shown in FIG. 30. The front end portion 32*a* of the contact 32 curves to be formed in a shape having spring elasticity. That is, when the compression connector 31 is not in contact with the substrate 11, the front end portion 32*a* of the contact 32 is disposed to project downward from the bottom surface of the bottom shell 35 (a state shown in FIG. 30). Therefore, when the bottom surface of the bottom shell 35 configuring the compression connector 31 is pressed in the −Z direction against the upper surface of the substrate 11, the front end portions 32*a* of the plurality of contacts 32 projecting downward from the bottom surface of the bottom shell 35 are pushed into the position of the bottom surface of the bottom shell 35 while applying force by the spring elasticity to the upper surface of the substrate 11. That is, the front end portions 32*a* of the plurality of contacts 32 receive force in the +Z direction. Therefore, when the compression connector 31 is attached to the substrate 11, since each of the plurality of contacts 32 is pressed against the upper surface of the substrate 11 by the force by the spring elasticity, for example, the not-shown printed circuit and the like disposed on the upper surface of the substrate 11 and the plurality of contacts 32 can maintain a stable and secure connection state.

On the other hand, the rear end portion 32*b* of the contact 32 has a linear shape extending straight. As shown in FIG. 30, the electric cable 36 is connected to the rear end portion 32*b* of the contact 32 by solder or the like. Therefore, an electric signal, power supply power, and the like from the outside are transmitted to the substrate 11 side via the electric cable 36 and the contact 32.

Figure 28:
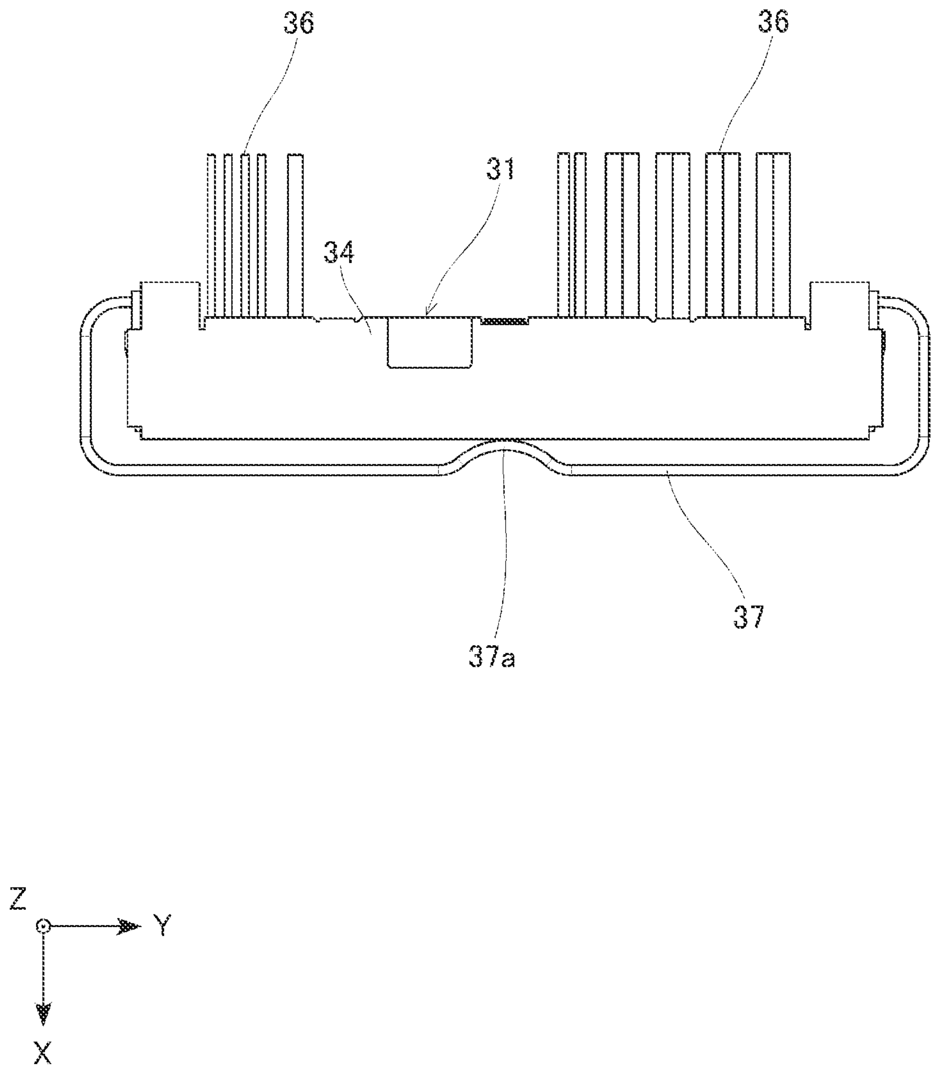
FIG. 28 is a top view of the compression connector according to the second embodiment.
Figure 29:
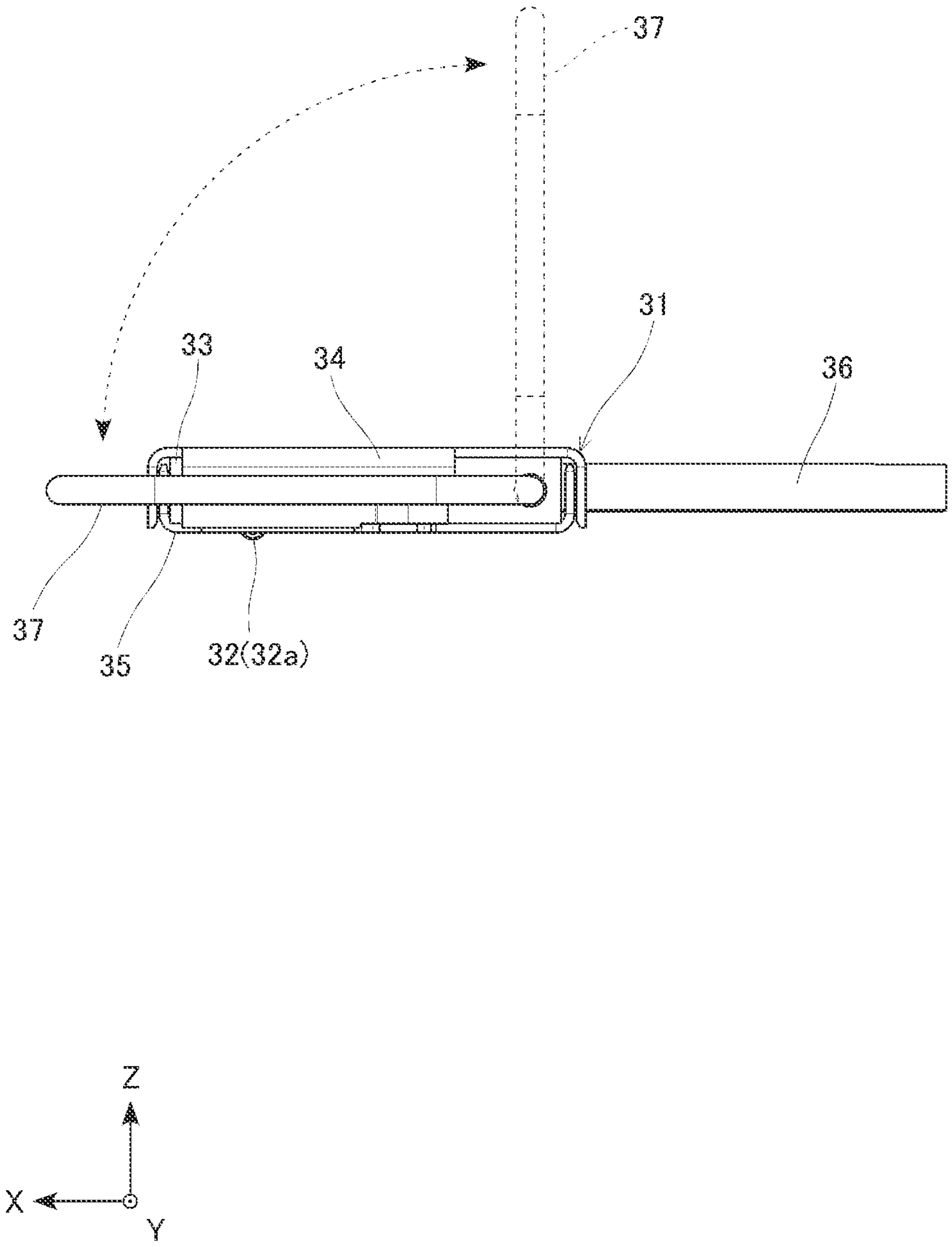
FIG. 29 is a right side view of the compression connector according to the second embodiment and is a diagram for explaining an operation example of a lock lever included in the compression connector.

The lock lever 37 is a member formed by bending a bar-like metal wire material. The lock lever 37 is a member formed in a substantially C shape. Both end portions of the lock lever 37 are attached closer to the left and right side surface rears of the housing 33 in a rotatable state. As shown in FIG. 28 and the like, the position of the front center at the time when the lock lever 37 is tilted to the front of the compression connector 31 is the lock section 37*a* curved and recessed toward the inner side (the connector side). The lock section 37*a* is formed to enter the lock hole 23 formed in the center position of the vertical front surface 21*b* configuring the cage 21 when the lock lever 37 is tilted to the front in a state in which the compression connector 31 is inserted into the cage 21. The lock section 37*a* of the lock lever 37 and the lock hole 23 of the cage 21 cooperate to function as means for fixing the compression connector 31 to the cage 21.

Note that, concerning the members configuring the compression connector 31 in the second embodiment, the plurality of contacts 32 are made of a conductive metal material and the housing 33 that fixes the plurality of contacts 32 is made of a nonconductive resin material or the like. The cover shell 34 that covers the upper surface portion of the housing 33 and the bottom shell 35 that covers the lower surface portion of the housing 33 are combined, in a state in which the housing 33 is included between the cover shell 34 and the bottom shell 35, in the up-down direction to form an outline shape of the compression connector 31. The cover shell 34 and the bottom shell 35 protect the housing 33, in which the plurality of contacts 32 that receive energization from the electric cable 36 are embedded, by being disposed to enclose the outer circumference of the housing 33 in which the plurality of contacts 32 are embedded. The protection also includes electric and magnetic protection such as an electromagnetic shield in addition to physical protection from an external environment.

The configuration of the connector with substrate 100 according to the second embodiment is explained above. Subsequently, a method of attaching the compression connector 31 to and a method of detaching the compression connector 31 from the substrate 11 attached with the cage 21 configuring the connector with substrate 100 according to the second embodiment are explained.

Figure 23:
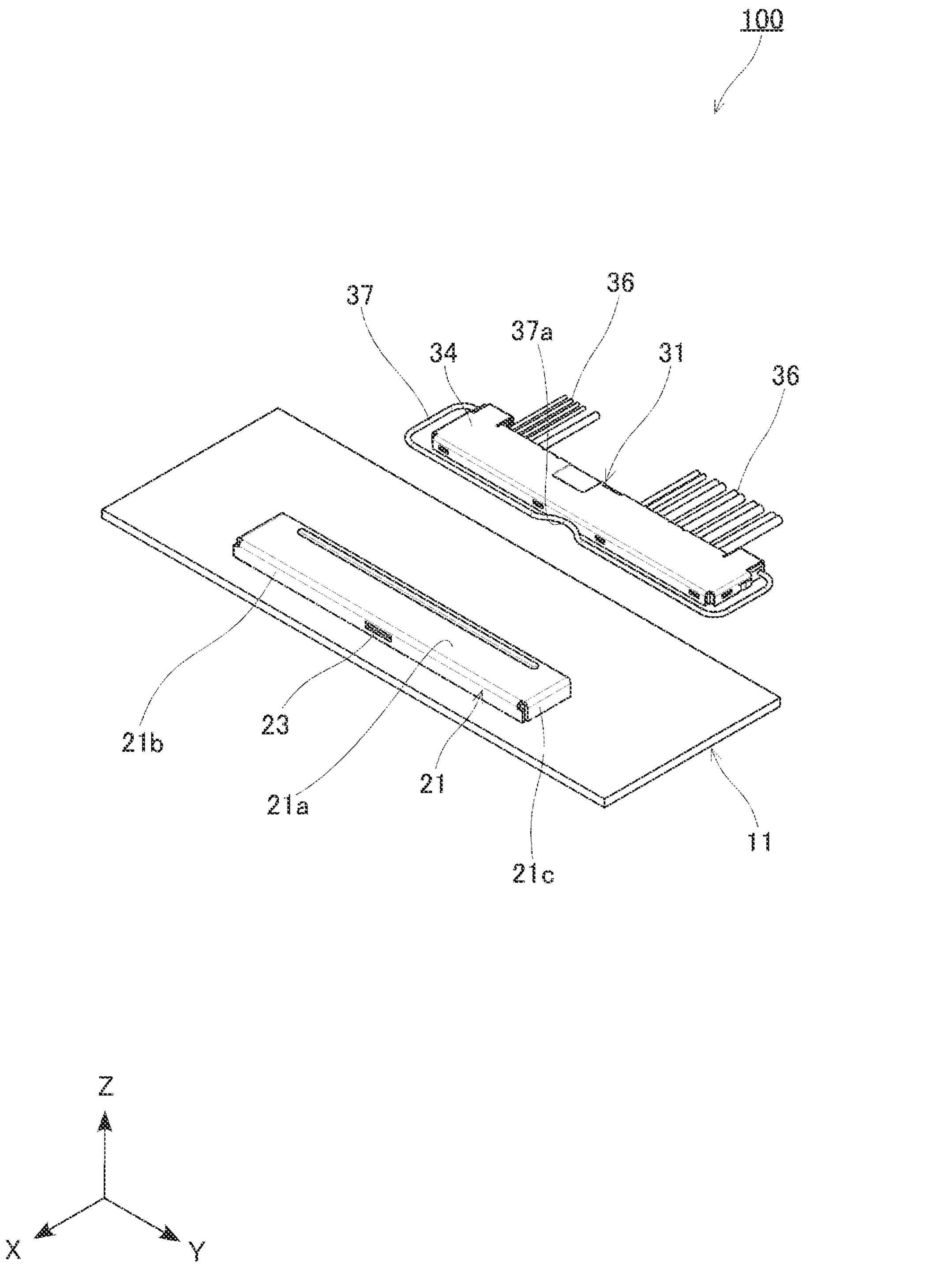
FIG. 23 is an exterior perspective view of a state in which a compression connector is detached from a substrate attached with a cage in the connector with substrate according to the second embodiment, the state being viewed from the front upper right.
Figure 24:
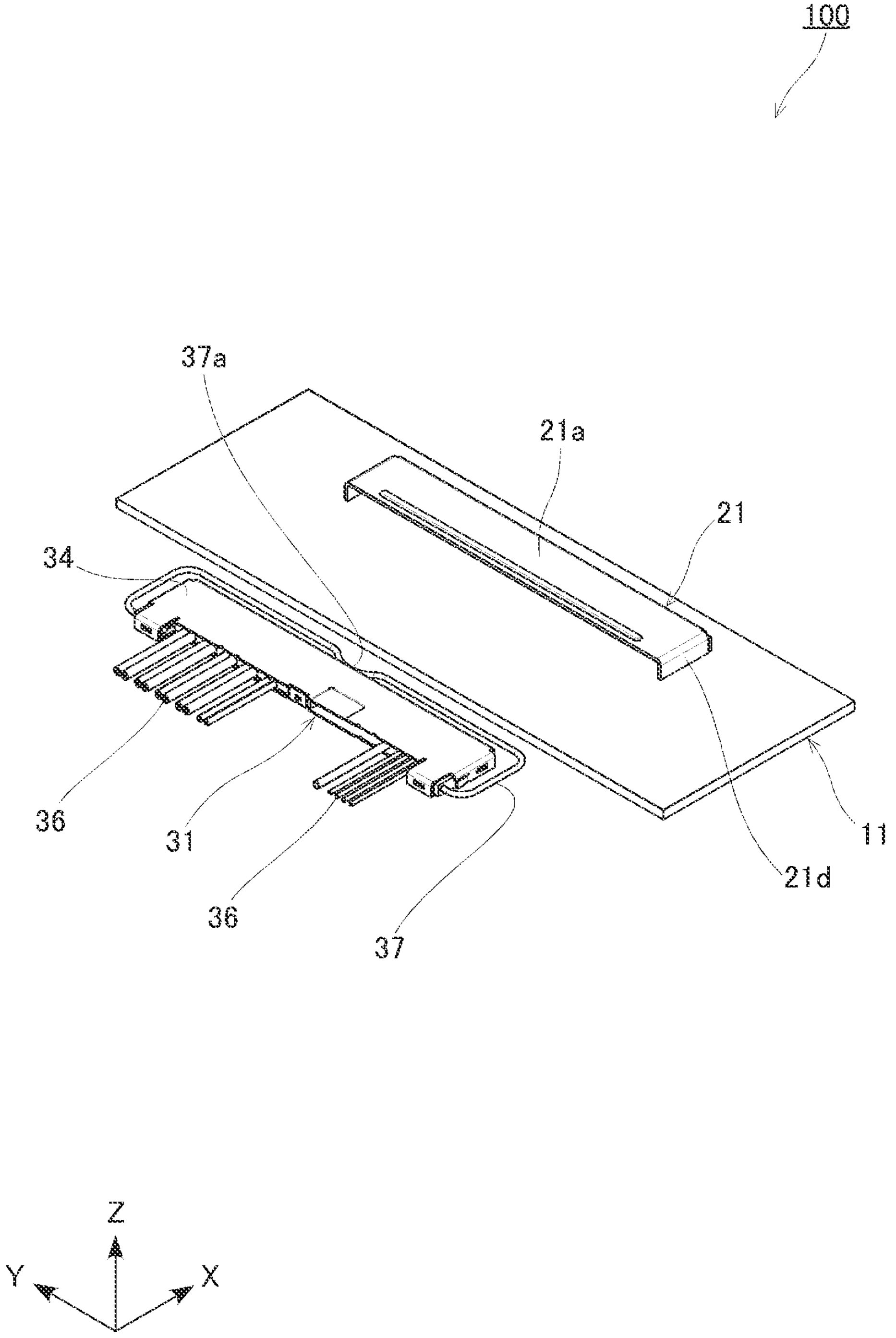
FIG. 24 is an exterior perspective view of the state in which the compression connector is detached from the substrate attached with the cage in the connector with substrate according to the second embodiment, the state being viewed from the rear upper left.
Figure 25:
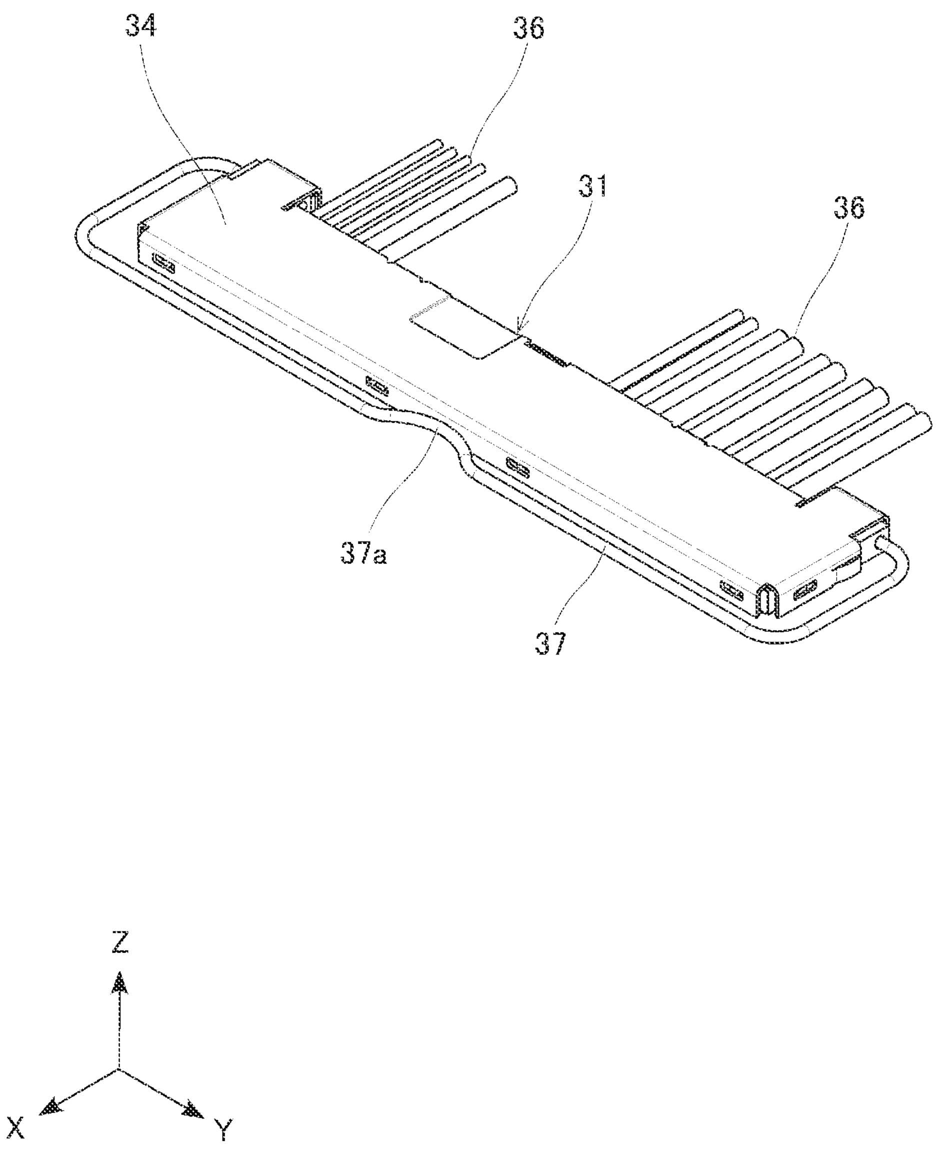
FIG. 25 is an exterior perspective view of the compression connector according to the second embodiment viewed from the front upper right.

When the compression connector 31 is attached to the substrate 11 attached with the cage 21, as shown in FIGS. 23 and 24, the compression connector 31 is moved in the horizontal direction from the rear of the cage 21 and inserted into the cage 21. At this time, the lock lever 37 included in the compression connector 31 is rotated upward and erected as indicated by a broken line in FIG. 29.

From this state, the compression connector 31 is horizontally moved and inserted into and housed in the region surrounded by the top surface 21*a*, the vertical front surface 21*b*, the vertical right side surface 21*c*, and the vertical left side surface 21*d* in the cage 21 and the upper surface of the substrate 11. Further, the lock lever 37 is rotated toward the front of the cage 21 and the lock section 37*a* of the lock lever 37 is fit in the lock hole 23 of the cage 21. At this time, since the lock lever 37 is a member formed by bending the bar-like metal wire material, the lock lever 37 has an elastic force of the elastic body of the present invention. Therefore, when it is attempted to rotate the lock lever 37 in order to release the fit state of the lock section 37*a* and the lock hole 23, the elastic force of the metal material as the elastic body functions and acts as a force for maintaining the fit state. When it is attempted to pull out the compression connector 31 from the cage 21 in the state in which the lock section 37*a* is fit in the lock hole 23, the lock lever 37 is caught in the cage 21 and hinders the compression connector 31 from being pulled out. That is, by fitting the lock section 37*a* of the lock lever 37 in the lock hole 23 of the cage 21, a fixed state of the compression connector 31 to the substrate 11 attached with the cage 21 is appropriately maintained.

The compression connector 31 inserted into and fixed to the substrate 11 attached with the cage 21 applies, to the substrate 11, contact reaction in the vertical direction applied by the plurality of contacts 32 included in the compression connector 31. However, since the contact reaction in the vertical direction applied by the plurality of contacts 32 is received by, in particular, the top surface 21*a* configuring the upper surface of the cage 21 in the cage 21 that houses the compression connector 31. Further, since the lock section 37*a* of the lock lever 37 and the lock hole 23 of the cage 21 cooperate to exert a function of slip-off prevention for the compression connector 31, a stable fixed state of the compression connector 31 to the substrate 11 is maintained.

On the other hand, when the compression connector 31 is detached from the substrate 11 attached with the cage 21 in a state shown in FIGS. 20 and 21, the user can detach the compression connector 31 from the substrate 11 attached with the cage 21 by rotating the lock lever 37 to release the fit state of the lock section 37*a* and the lock hole 23 and horizontally pulling out the compression connector 31 from the cage 21 rearward from that state.

As explained above, in the connector with substrate 100 according to the second embodiment, by using the lock lever 37 functioning as the elastic body that is formed in the compression connector 31 and applies the elastic force, it is possible to obtain a simple and secure fixed state of the compression connector 31 to the substrate 11 attached with the cage 21. Since the lock lever 37 functioning as the elastic body that applies the elastic force is the member formed in the compression connector 31, the lock lever 37 is not dropped or lost unlike the screws and the nuts of the related art. Further, since the connector with substrate 100 contains a mechanism for fixing the compression connector 31 with the elastic force exerted by the lock lever 37, unlike with the related art, work manhours involving attachment are reduced and torque management for the screws is unnecessary. That is, with the connector with substrate 100 according to the second embodiment, it is possible to perform secure attachment while improving workability of attachment (fixing) of the compression connector 31 to the substrate 11.

A preferred embodiment of the present invention is explained above. However, the technical scope of the present invention is not limited to the scope described in the second embodiment. Various changes or improvements can be added to the second embodiment.

For example, in the second embodiment explained above, an example of the case in which the lock lever 37 functioning as the elastic body that applies the elastic force is formed for the compression connector 31 is explained. However, the elastic body that applies the elastic force may be formed for the cage 21. In that case, the lock hole in which the lock section of the lock lever is fit only has to be formed for the compression connector.

It is evident from the description of the claims that such changed or improved forms can also be included in the technical scope of the present invention.

REFERENCE SIGNS LIST

10 Connector with substrate (in first embodiment)
100 Connector with substrate (in second embodiment)
11 Substrate
13 Opening section (Hole)
21 Cage
21*a* Top surface
21*b* Vertical front surface (Vertical surface)
21*c* Vertical right side surface (Vertical surface)
21*d* Vertical left side surface (Vertical surface)
21*e* Projecting section
21*f* Erected section
21*g* Spring piece (Elastic body)
22 Leg section
23 Lock hole
31 Compression connector 32 Contact
32*a* Front end portion
32*b* Rear end portion
33 Housing
34 Cover shell
35 Bottom shell
36 Electric cable
37 Lock lever (Elastic body)
37*a* Lock section

What is claimed is:

1. A connector with substrate in which a compression connector pressed against and connected to a connection target object and a substrate are attached via a cage, the connector with substrate comprising:
  a substrate including
    an opening section;
  a cage fixed on the substrate and including
    a projecting section extending toward a connector insertion side of the cage,
    an erected section formed at an end of the projecting section on the connector insertion side and having a L shape, and
    a spring piece formed at an upper end of the erected section as an elastic body and obliquely extending relative to an upper surface of the substrate; and
  a compression connector inserted into the cage from the connector insertion side of the cage and including
    contacts that are in contact with the substrate,
    a housing to which the contacts are fixed, and
    a cover shell that covers an upper surface portion of the housing, wherein
  when an external force is applied to the spring piece to insert the compression connector into cage, a distal end of the spring piece enters in the opening section of the substrate and the spring piece exerts an elastic force to press the compression connector against the cage, and
  when the compression connector is completely inserted into the cage, the distal end of the spring piece is positioned at a rear end of the compression connector to prevent the compression connector from slipping off.

2. The connector with substrate according to claim 1, wherein the spring piece is obliquely extended toward the upper surface of the substrate such that the compression connector is obliquely inserted into the cage.

3. A connector with substrate in which a compression connector pressed against and connected to a connection target object and a substrate are attached via a cage, the connector with substrate comprising:
  a substrate;
  a cage fixed on the substrate, and including
    a lock hole formed at a front surface; and
  a compression connector inserted into the cage and including
    contacts that are in contact with the substrate,
    a housing to which the contacts are fixed,
    a cover shell that covers an upper surface portion of the housing, and
    a lock lever formed at a rear end of the compression connector as an elastic body and having a lock section curved and recessed inwardly, the lock lever rotating in an inserting direction to enter the lock section into the lock hole, wherein
  when an external force is applied to the lock lever entered into the lock hole, the lock lever exerts an elastic force to fix the compression connector to the cage.

4. The connector with substrate according to claim 3, wherein the cage includes a top surface that receives contact reaction of the compression connector, and
  the case includes a vertical surface that vertically extends from the top surface and in which the lock hole is formed.

5. The connector with substrate according to claim 1, wherein the compression connector includes a bottom shell that covers a lower surface portion of the housing.

6. The connector with substrate according to claim 1, wherein the cage includes a base portion fixed on the substrate and an opening portion into which the compression connector inserted,
  the projecting section includes two projecting portions respectively extending outwardly from two sides of the base portion on a side of the opening portion,
  the erected section includes two erected portions respectively extending inwardly from outer ends of the two projecting portions, each of the two erected portions forming the L shape, and
  the spring piece includes two spring portions respectively extending obliquely from upper ends of the two erected portions toward the opening portion.

7. The connector with substrate according to claim 6, wherein the cage includes a reinforcement portion formed on an upper portion of the cage, and
  each of the two spring portions has a curved portion formed at a lower end thereof and curving downwardly toward the upper surface of the substrate.

8. The connector with substrate according to claim 3, wherein the lock hole is formed at a center portion of the cage at the front surface thereof, and
  the lock lever includes
    two rear portions respectively extending outwardly from side portions of the compression connector at the rear end thereof,
    two side portions respectively extending linearly toward a front side of the compression connector from front ends of the two rear portions, and
    a front portion extending between front ends of the two side portions and having the lock section at a center portion of the front portion, the lock section being inwardly curved and recessed toward the rear end of the compression connector.

9. The connector with substrate according to claim 8, wherein when the lock lever rotates between an insertion position where the lock section enters into the lock hole, and a release position where the lock section is released from the lock hole, and
  the lock lever is arranged substantially parallel to the substrate at the lock position, and the lock lever is arranged substantially orthogonal to the substrate at the release position.

10. The connector with substrate according to claim 9, wherein the cage includes a reinforcement portion formed on an upper portion of the cage.

* * * * *